(12) United States Patent  
Greger et al.

(10) Patent No.: US 8,186,705 B2
(45) Date of Patent: May 29, 2012

(54) STROLLER

(75) Inventors: Jeff G. Greger, Lititz, PA (US); Michael L. Longenecker, Lancaster, PA (US)

(73) Assignee: Artsana USA, Inc., Lancaster, PA (US)

(*) Notice: Subject to any disclaimer, the term of this patent is extended or adjusted under 35 U.S.C. 154(b) by 371 days.

(21) Appl. No.: 12/541,622

(22) Filed: Aug. 14, 2009

(65) Prior Publication Data

US 2010/0038886 A1 Feb. 18, 2010

Related U.S. Application Data

(60) Provisional application No. 61/089,249, filed on Aug. 15, 2008.

(51) Int. Cl.
B62B 7/06 (2006.01)
(52) U.S. Cl. .................. 280/643; 280/642; 280/650
(58) Field of Classification Search ............ 280/33.993, 280/47.38, 639, 642, 643–644, 647, 648, 280/649, 650, 658
See application file for complete search history.

(56) References Cited

U.S. PATENT DOCUMENTS

| | | | |
|---|---|---|---|
| 1,598,778 A | 5/1923 | Leake | |
| 1,709,527 A | 4/1929 | Ford | |
| 2,616,719 A | 11/1952 | Heideman | |
| 2,783,053 A | 2/1957 | Sheldrick et al. | |
| 3,112,042 A | 11/1963 | Leshner | |
| 3,168,330 A | 2/1965 | Smith et al. | |
| 3,227,484 A | 1/1966 | Merclean | |
| 3,390,893 A | 7/1968 | MacLaren | |
| 3,459,435 A | 8/1969 | Garner | |
| 3,504,926 A | 4/1970 | Glaser | |
| 3,556,546 A | 1/1971 | Garner | |
| 3,561,787 A | 2/1971 | Toda et al. | |
| 3,653,681 A | 4/1972 | Virtue | |
| 3,784,252 A * | 1/1974 | Peterson | ........... 297/364 |
| 3,799,567 A | 3/1974 | Toda | |
| 3,989,295 A | 11/1976 | Sparkes | |
| 4,007,947 A | 2/1977 | Perego | |
| 4,023,825 A | 5/1977 | Kassai | |
| 4,046,401 A | 9/1977 | Kassai | |
| 4,111,454 A | 9/1978 | Kassai | |
| 4,126,331 A | 11/1978 | Sloan et al. | |
| 4,191,397 A | 3/1980 | Kassai | |

(Continued)

FOREIGN PATENT DOCUMENTS

BE 818905 12/1974

(Continued)

OTHER PUBLICATIONS

Evenflo® Easy Comfort Premier™ Stroller (1999).

(Continued)

*Primary Examiner* — J. Allen Shriver, II
*Assistant Examiner* — James Triggs
(74) *Attorney, Agent, or Firm* — Volpe and Koenig, P.C.

(57) ABSTRACT

A stroller having a frame with front and rear portions and right and left sides. A seat having a seat base and a seat back is mounted to the front portion of the frame. The seat back is rotatable relative to the frame between a back support position and a travel seat support position where the seat back is substantially parallel to and above the seat base when the stroller is in an operating position.

25 Claims, 23 Drawing Sheets

U.S. PATENT DOCUMENTS

| | | |
|---|---|---|
| 4,232,897 A | 11/1980 | Maclaren et al. |
| 4,248,443 A | 2/1981 | Ohlson |
| 4,317,581 A | 3/1982 | Kassai |
| 4,322,093 A | 3/1982 | Otto |
| 4,335,900 A | 6/1982 | Fleischer |
| 4,362,315 A | 12/1982 | Kassai |
| 4,365,819 A | 12/1982 | Bart |
| 4,378,946 A | 4/1983 | Voytko et al. |
| 4,412,688 A | 11/1983 | Giordani |
| 4,415,180 A | 11/1983 | Payne, Jr. |
| 4,513,974 A | 4/1985 | Lin |
| 4,542,915 A | 9/1985 | Wheeler, III et al. |
| 4,564,212 A | 1/1986 | Orlandino et al. |
| 4,591,176 A | 5/1986 | Kassai |
| 4,602,395 A | 7/1986 | Kassai |
| 4,606,550 A | 8/1986 | Cone |
| 4,610,460 A | 9/1986 | Kassai |
| 4,632,420 A | 12/1986 | Miyagi |
| 4,632,421 A | 12/1986 | Shamie |
| 4,660,850 A | 4/1987 | Nakao et al. |
| 4,706,986 A | 11/1987 | Kassai |
| 4,733,882 A | 3/1988 | Kassai |
| 4,741,056 A | 5/1988 | Kassai |
| 4,741,551 A | 5/1988 | Perego |
| 4,763,911 A | 8/1988 | Gebhard et al. |
| 4,763,919 A | 8/1988 | Nakao et al. |
| 4,768,795 A | 9/1988 | Mar |
| 4,770,437 A | 9/1988 | Glaser |
| 4,805,928 A | 2/1989 | Nakao et al. |
| 4,807,928 A | 2/1989 | Cone |
| 4,817,982 A | 4/1989 | Kassai |
| 4,819,958 A | 4/1989 | Perego |
| 4,832,361 A | 5/1989 | Nakao et al. |
| 4,856,809 A | 8/1989 | Kohus et al. |
| 4,886,289 A | 12/1989 | Yee et al. |
| 4,892,327 A | 1/1990 | Cabagnero |
| 4,906,017 A | 3/1990 | Kassai |
| 4,907,818 A | 3/1990 | Chai |
| 4,924,725 A | 5/1990 | Takahashi et al. |
| D308,656 S | 6/1990 | Takahashi et al. |
| 4,930,697 A | 6/1990 | Takahashi et al. |
| D310,645 S | 9/1990 | Julien |
| 4,953,887 A | 9/1990 | Takahashi et al. |
| 4,968,092 A | 11/1990 | Giambrone |
| D317,280 S | 6/1991 | Takahashi et al. |
| 5,028,061 A | 7/1991 | Hawkes |
| D320,370 S | 10/1991 | Takahashi et al. |
| 5,056,805 A | 10/1991 | Wang |
| 5,074,575 A | 12/1991 | Bigo |
| 5,087,066 A | 2/1992 | Mong-Hsing |
| 5,110,150 A | 5/1992 | Chen |
| 5,143,398 A | 9/1992 | Teng |
| 5,181,735 A | 1/1993 | Onishi |
| 5,184,835 A | 2/1993 | Huang |
| 5,201,535 A | 4/1993 | Kato et al. |
| 5,205,577 A | 4/1993 | Liu |
| 5,205,579 A | 4/1993 | Kato et al. |
| D337,257 S | 7/1993 | Danieli |
| 5,238,292 A | 8/1993 | Golenz et al. |
| 5,244,228 A | 9/1993 | Chiu |
| 5,246,272 A | 9/1993 | Kato et al. |
| 5,257,799 A | 11/1993 | Cone et al. |
| D352,017 S | 11/1994 | Kaneko |
| 5,362,089 A | 11/1994 | Jyan-Tsai |
| 5,388,852 A | 2/1995 | Bigo et al. |
| 5,398,951 A | 3/1995 | Ryu |
| D357,439 S | 4/1995 | Haut et al. |
| D357,440 S | 4/1995 | Pietra |
| 5,417,449 A | 5/1995 | Shamie |
| 5,417,450 A | 5/1995 | Wang |
| 5,427,402 A | 6/1995 | Huang |
| 5,431,478 A | 7/1995 | Noonan |
| 5,437,493 A | 8/1995 | Weisleder |
| 5,441,163 A | 8/1995 | Carrasco |
| 5,454,584 A | 10/1995 | Haut et al. |
| 5,460,395 A | 10/1995 | Chen |
| 5,460,398 A | 10/1995 | Huang |
| 5,472,224 A | 12/1995 | Cabagnero |
| 5,478,102 A | 12/1995 | Huang |
| 5,489,138 A | 2/1996 | Mariol et al. |
| 5,511,259 A | 4/1996 | Tarara |
| 5,511,441 A | 4/1996 | Arai |
| 5,524,503 A | 6/1996 | Ishikura |
| 5,527,090 A | 6/1996 | Cone, II |
| 5,605,409 A | 2/1997 | Haut et al. |
| 5,622,377 A | 4/1997 | Shamie |
| 5,645,293 A | 7/1997 | Cheng |
| 5,649,737 A | 7/1997 | Behnke |
| 5,664,795 A | 9/1997 | Huang |
| 5,669,623 A | 9/1997 | Onishi |
| 5,669,624 A | 9/1997 | Eichhorn |
| 5,669,625 A | 9/1997 | Jane Cabagnero |
| 5,676,386 A | 10/1997 | Huang |
| 5,718,444 A | 2/1998 | Huang |
| 5,722,682 A | 3/1998 | Wang |
| 5,727,798 A | 3/1998 | Walters et al. |
| 5,741,021 A | 4/1998 | Saint et al. |
| 5,752,738 A | 5/1998 | Onishi et al. |
| 5,765,855 A | 6/1998 | Chiu |
| 5,765,856 A | 6/1998 | Kiser |
| 5,769,447 A | 6/1998 | Huang |
| 5,772,235 A | 6/1998 | Espenshade |
| 5,775,718 A | 7/1998 | Huang |
| 5,795,091 A | 8/1998 | Kakuda et al. |
| 5,810,432 A | 9/1998 | Haut et al. |
| 5,845,666 A | 12/1998 | Messner |
| 5,845,924 A | 12/1998 | Huang |
| 5,876,057 A | 3/1999 | Huang |
| 5,887,935 A | 3/1999 | Sack |
| D412,142 S | 7/1999 | Dickie |
| 5,921,571 A | 7/1999 | Bell |
| 5,934,757 A | 8/1999 | Smith |
| 5,938,229 A | 8/1999 | Chen et al. |
| 5,947,555 A | 9/1999 | Welsh, Jr. et al. |
| D415,075 S | 10/1999 | Lan |
| 5,979,928 A | 11/1999 | Kuo |
| 5,984,332 A | 11/1999 | Beaudoin et al. |
| 5,988,669 A | 11/1999 | Freese et al. |
| 5,988,670 A | 11/1999 | Song et al. |
| D419,113 S | 1/2000 | Everett |
| D421,940 S | 3/2000 | Gibson et al. |
| 6,068,284 A | 5/2000 | Kakuda |
| 6,070,890 A | 6/2000 | Haut et al. |
| D427,822 S | 7/2000 | Greger |
| 6,099,022 A | 8/2000 | Pring |
| 6,102,431 A | 8/2000 | Sutherland et al. |
| D431,212 S | 9/2000 | Haung |
| D431,213 S | 9/2000 | Yang |
| 6,116,624 A | 9/2000 | Hu |
| 6,129,373 A | 10/2000 | Cheng |
| 6,139,046 A | 10/2000 | Aalund et al. |
| 6,152,476 A | 11/2000 | Huang |
| 6,155,740 A | 12/2000 | Hartenstine |
| 6,189,914 B1 | 2/2001 | Worth et al. |
| 6,193,263 B1 | 2/2001 | Lin |
| 6,209,829 B1 | 4/2001 | Yu |
| 6,273,451 B1 | 8/2001 | Julien et al. |
| 6,286,844 B1 | 9/2001 | Cone, II et al. |
| 6,296,004 B1 | 10/2001 | Gordon |
| 6,299,194 B1 | 10/2001 | Chen |
| 6,302,613 B1 | 10/2001 | Lan |
| D452,192 S | 12/2001 | Hartenstine et al. |
| 6,339,862 B1 | 1/2002 | Cheng |
| 6,368,006 B1 | 4/2002 | Yang et al. |
| 6,398,233 B1 | 6/2002 | Liang et al. |
| 6,409,205 B1 | 6/2002 | Bapst et al. |
| 6,412,809 B1 | 7/2002 | Bigo et al. |
| 6,443,261 B1 | 9/2002 | Gibson et al. |
| 6,443,479 B2 | 9/2002 | Huang |
| 6,446,990 B1 | 9/2002 | Nania et al. |
| 6,467,739 B1 | 10/2002 | Jou |
| 6,478,327 B1 | 11/2002 | Hartenstine et al. |
| D470,803 S | 2/2003 | Hansen |
| D473,663 S | 4/2003 | Chou |
| 6,557,871 B2 | 5/2003 | Hsia |
| 6,557,885 B1 | 5/2003 | Kakuda |
| 6,572,134 B2 | 6/2003 | Barrett et al. |

| | | |
|---|---|---|
| 6,581,957 B1 | 6/2003 | Lan |
| D480,195 S | 9/2003 | Koerlin et al. |
| 6,666,473 B2 | 12/2003 | Hartenstine et al. |
| D494,511 S | 8/2004 | Chen |
| 6,851,700 B2 | 2/2005 | Yoshie et al. |
| 7,017,921 B2 | 3/2006 | Eros |
| 7,017,937 B2 | 3/2006 | Williams |
| 7,032,922 B1 | 4/2006 | Lan |
| D521,422 S | 5/2006 | Williams |
| 7,044,497 B2 | 5/2006 | Hartenstine et al. |
| 7,185,909 B2 | 3/2007 | Espenshade et al. |
| 7,188,858 B2 | 3/2007 | Hartenstine et al. |
| D545,074 S | 6/2007 | Loew et al. |
| 7,281,732 B2 | 10/2007 | Fox et al. |
| D558,648 S | 1/2008 | Feyler et al. |
| 7,338,122 B2 | 3/2008 | Hei et al. |
| D566,629 S | 4/2008 | Taylor |
| 7,445,229 B2 | 11/2008 | Dotsey et al. |
| 7,445,230 B2 | 11/2008 | Kassai et al. |
| 7,475,900 B2 * | 1/2009 | Cheng .................. 280/642 |
| D593,272 S | 5/2009 | Hailston |
| D604,151 S | 11/2009 | Kollman et al. |
| 7,621,431 B2 | 11/2009 | Williams |
| 7,658,399 B2 * | 2/2010 | Van Dijk ............... 280/642 |
| 7,686,322 B2 | 3/2010 | Longenecker et al. |
| D617,255 S | 6/2010 | Tezak et al. |
| D630,934 S | 1/2011 | Kollman et al. |
| 7,871,100 B2 | 1/2011 | Chen et al. |
| D636,300 S | 4/2011 | Greger et al. |
| 7,938,435 B2 * | 5/2011 | Sousa et al. ............ 280/658 |
| 8,033,555 B2 * | 10/2011 | Mostert et al. ......... 280/47.38 |
| 2005/0012306 A1 | 1/2005 | Lan |
| 2005/0242549 A1 | 11/2005 | Longenecker et al. |
| 2006/0001226 A1 | 1/2006 | Refsum |
| 2006/0131840 A1 | 6/2006 | Donay |
| 2006/0131841 A1 | 6/2006 | Huang |
| 2006/0152059 A1 | 7/2006 | Refsum |
| 2006/0157945 A1 | 7/2006 | Refsum |
| 2006/0219374 A1 | 10/2006 | McKinney |
| 2006/0261576 A1 | 11/2006 | Dotsey et al. |
| 2009/0127827 A1 * | 5/2009 | Pike et al. ............. 280/648 |
| 2009/0127828 A1 | 5/2009 | Longenecker et al. |
| 2009/0243260 A1 | 10/2009 | Longenecker et al. |
| 2010/0171289 A1 | 7/2010 | Greger et al. |

FOREIGN PATENT DOCUMENTS

| | | |
|---|---|---|
| DE | 34 07 241 | 2/1984 |
| DE | 35 25 834 | 7/1985 |
| DE | 38 30 752 | 9/1988 |
| DE | 40 22 391 | 7/1990 |
| DE | 42 29 857 | 9/1992 |
| DE | 195 43 273 | 11/1995 |
| DE | 196 15 901 | 4/1996 |
| DE | 196 38 097 | 9/1996 |
| DE | 198 33 857 | 7/1997 |
| DE | 198 33 115 | 7/1998 |
| DE | 299 00 901 | 1/1999 |
| DE | 200 01 964 | 4/2000 |
| DE | 200 02 027 | 4/2000 |
| DE | 203 11 781 | 10/2003 |
| EP | 0 422 812 | 10/1990 |
| EP | 0 639 489 | 8/1994 |
| EP | 0 719 693 | 11/1995 |
| EP | 0 897 848 | 8/1998 |
| EP | 0 901 953 | 3/1999 |
| EP | 0 997 367 | 8/1999 |
| EP | 0 994 004 | 4/2000 |
| EP | 1 153 817 | 11/2001 |
| EP | 1 170 193 | 1/2002 |
| EP | 1 160 145 | 12/2004 |
| EP | 1 666 331 | 6/2006 |
| EP | 1 591 339 | 12/2008 |
| ES | 2 016 525 | 8/1989 |
| ES | 2 069 458 | 9/1992 |
| FR | 2 089 832 | 4/1971 |
| FR | 2 244 348 | 9/1973 |
| FR | 2 267 918 | 4/1974 |
| FR | 2 257 482 | 1/1975 |
| FR | 2 323 563 | 9/1975 |
| FR | 2 667 512 | 10/1990 |
| FR | 2 767 509 | 8/1998 |
| GB | 0 690 115 | 5/1950 |
| GB | 1 176 516 | 7/1967 |
| GB | 1 394 564 | 12/1973 |
| GB | 1 510 312 | 9/1974 |
| GB | 1 561 594 | 10/1976 |
| GB | 2 124 556 | 6/1982 |
| GB | 2 186 793 | 2/1987 |
| GB | 2 197 784 | 6/1988 |
| GB | 2 225 557 | 12/1988 |
| GB | 2 244 029 | 3/1990 |
| GB | 2 268 394 | 5/1992 |
| GB | 2 251 830 | 7/1992 |
| GB | 2 318 099 | 10/1996 |
| GB | 2 324 510 | 3/1998 |
| GB | 2 342 897 | 10/1999 |
| IT | 1233953 | 1/1989 |
| JP | 10-35506 | 2/1989 |
| JP | 10-35506 | 2/1998 |
| JP | 10-35506 | 2/1998 |
| JP | 10-35506 | 2/1998 |
| NL | 1009312 | 6/1998 |
| PT | 84257 | 2/1987 |
| SU | 1156949 | 4/1983 |
| WO | 88/02714 | 4/1988 |
| WO | 93/07039 | 4/1993 |
| WO | 99/50123 | 10/1999 |
| WO | 00/06437 | 2/2000 |
| WO | 01/28840 | 4/2001 |
| WO | 2009/065129 | 5/2009 |

OTHER PUBLICATIONS

Evenflo® Light & Easy™ Stroller (1999).
Evenflo® Easy Comfort Classic™ Travel System (1999).
Evenflo® Easy Comfort Plus™ Travel System (1999).
Evenflo® Easy Comfort Premier™ Travel System (1999).
JANE® Twin Two Stroller (printed May 5, 2010).

* cited by examiner

STROLLER

CROSS REFERENCE TO RELATED APPLICATION

This application claims the benefit of U.S. Provisional Patent App. No. 61/089,249, which is incorporated by reference herein as if fully set forth.

FIELD OF INVENTION

The present application relates generally to the field of child strollers. More particularly, the present application relates to a stroller seat having an improved mechanism for mounting a child travel seat. The present application also relates to a tandem stroller with an improved compact folding system.

BACKGROUND

Particularly, with infants, it is desirable to design a stroller that can secure a travel seat, such as an infant car seat carrier, so that the travel seat can be mounted between a car seat base and a stroller without having to remove the infant from the travel seat. An example of a stroller that can accommodate such a travel seat is disclosed in U.S. Patent Pub. Nos. 2005/0242549 and 2005/0264062, which are incorporated herein by reference as if fully set forth. It is known in the art to mount child travel seats in both single and tandem strollers.

Tandem strollers, also known as dual or double strollers, allow a parent to place two children in the same stroller assembly. A common arrangement for a tandem stroller is to have a first child seat oriented in the front portion of the stroller and a second child seat oriented in the rear portion of the stroller. In a modified arrangement, a standing platform can replace the second seat to accommodate an older child.

Overall size of the stroller and mounted child travel seat is an important consideration for consumers. Maintaining an acceptable size is challenging when mounting a child travel seat to a tandem stroller, and mounting two child travel seats to a tandem stroller presents an even greater challenge. Many tandem strollers attempt to meet the challenge of mounting two travel seats by using additional removable components to mount a travel seat to the front of the stroller. For example, many tandem strollers require a travel seat adapter to be mounted on the front end of the stroller to secure a travel seat. However, requiring additional components to accomplish this function is typically time consuming and undesirable to consumers. Thus, there is a need for a tandem stroller that can accommodate two child travel seats without requiring additional components.

In addition, fabric management becomes difficult with tandem strollers in order to keep travel seat securing devices on the stroller exposed for engagement with a complementary securing device on a travel seat. It is desirable to have a tandem stroller with a travel seat securing device positioned in an area on the stroller which requires minimal fabric management.

Known tandem strollers having a front and rear seat configuration are often long and do not fold compactly. It is well recognized that strollers having a large length between the front wheels and rear wheels ("wheel base length") are more difficult to control and maneuver. In addition, such strollers typically do not fold compactly and are difficult to store in a storage area, such as a vehicle trunk or cargo space. Therefore, there remains a need for a tandem stroller that can accommodate two travel seats, has a shorter wheelbase length, and a more compact fold.

SUMMARY

The present invention is directed to a stroller including a frame that is convertible between an operating position for use and a collapsed position for storage. The frame includes least one front leg, at least one rear leg, at least on wheel mounted on each leg, and a handlebar connected to the at least one rear leg. The frame defines front and rear portions and right and left sides. The stroller further includes a seat having a seat base and a seat back mounted to the frame. The seat base has an upper surface and a lower surface, and the seat back has a front surface and a rear surface. When the frame is in the operating position, the seat back is rotatable relative to the frame between at least one back support position and a travel seat support position where the seat back is substantially parallel to and above the seat base. The front surface of the seat back is adjacent the upper surface of the seat base in the travel seat support position.

The present invention is further directed to a child transportation device including a frame having a front and rear portion and right and left sides. The frame includes right and left upper horizontal support rails, right and left lower horizontal support rails, and a handle bar assembly connected to the right and left upper horizontal support parallel rails. The child transportation device further includes a front seat having a front seat back and a front seat base connected to the right and left lower horizontal support rails at the front portion of the frame. The front seat back is rotatable relative to the front seat base between a plurality of back support positions and a travel seat support position where the front seat back is substantially parallel to and above the front seat base when the stroller is in an operating position.

The present invention is still further directed to a collapsible stroller including a collapsible frame having a front portion and a rear portion. The frame has a left and right side support rails, a plurality of legs pivotally connected to the support rails, and at least one wheel mounted to each of the legs. At least one seat is supported by the frame. The seat includes a seat base and a seat back pivotally connected to the seat base. The seat base is slidably affixed to at least one counter structure attached to the frame. Each of the legs pivots with respect to at least one of the support rails to move the stroller between an operating position and a collapsed position, and the seat base slides with respect to the at least one counter structure in a direction towards the rear portion of the frame when the stroller is moved towards the collapsed position.

BRIEF DESCRIPTION OF THE DRAWINGS

The present invention will be better understood when read in conjunction with the following detailed description of the preferred embodiments of the invention and the appended drawings. In the drawings.

DETAILED DESCRIPTION OF THE PREFERRED EMBODIMENTS

Figure 1:
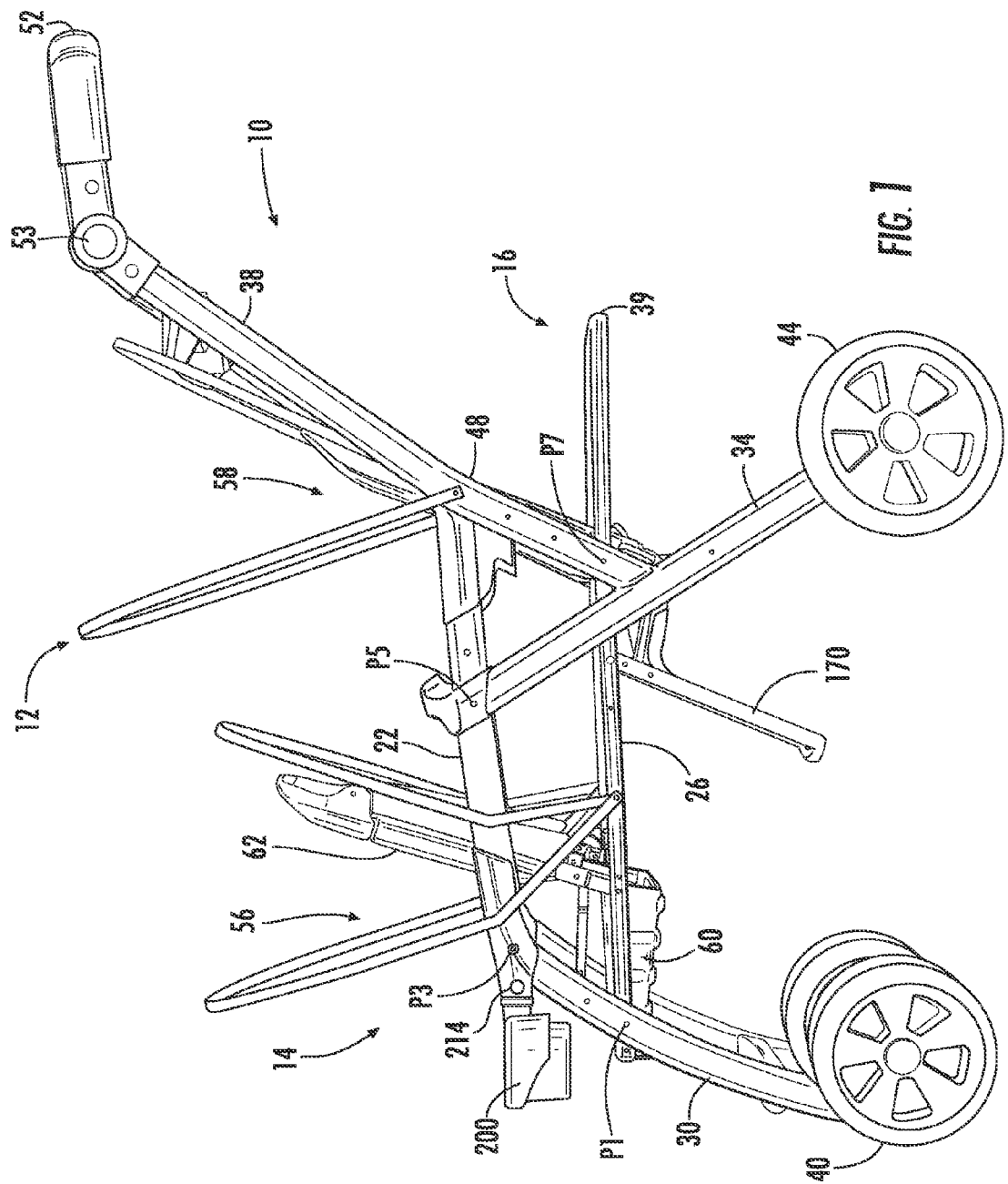
FIG. 1. is a side view of a tandem stroller of the present application in an operating position with the soft goods removed.

Certain terminology is used in the following description for convenience only and is not considered limiting. Words such as "front," "back," "top," and "bottom" designate directions in the drawings to which reference is made. This terminology includes the words specifically noted above, derivatives thereof, and words of similar import. Additionally, the terms "a" and "one" are defined as including one or more of the referenced item unless specifically noted. The phrase "at least one of" followed by a list of two or more items, such as "A, B or C," means any individual one of A, B or C, as well as any combination thereof.

As used hereinafter in the description and claims, the term "substantially parallel" when used with respect to two or more of the components of the invention is defined as parallel, or oriented to form only a small angle with respect to each other (i.e., less than 15°). As used hereinafter in the description and claims, the term "substantially perpendicular" when used with respect to two or more of the components of the invention is defined as perpendicular, or oriented with respect to each other to form an angle with only a slight difference from ninety degrees (i.e., between 75° and 105°).

With reference to drawing FIGS. 1-29, wherein like numerals indicate like elements throughout, preferred embodiments of the invention will be described in more detail below.

Figure 2:
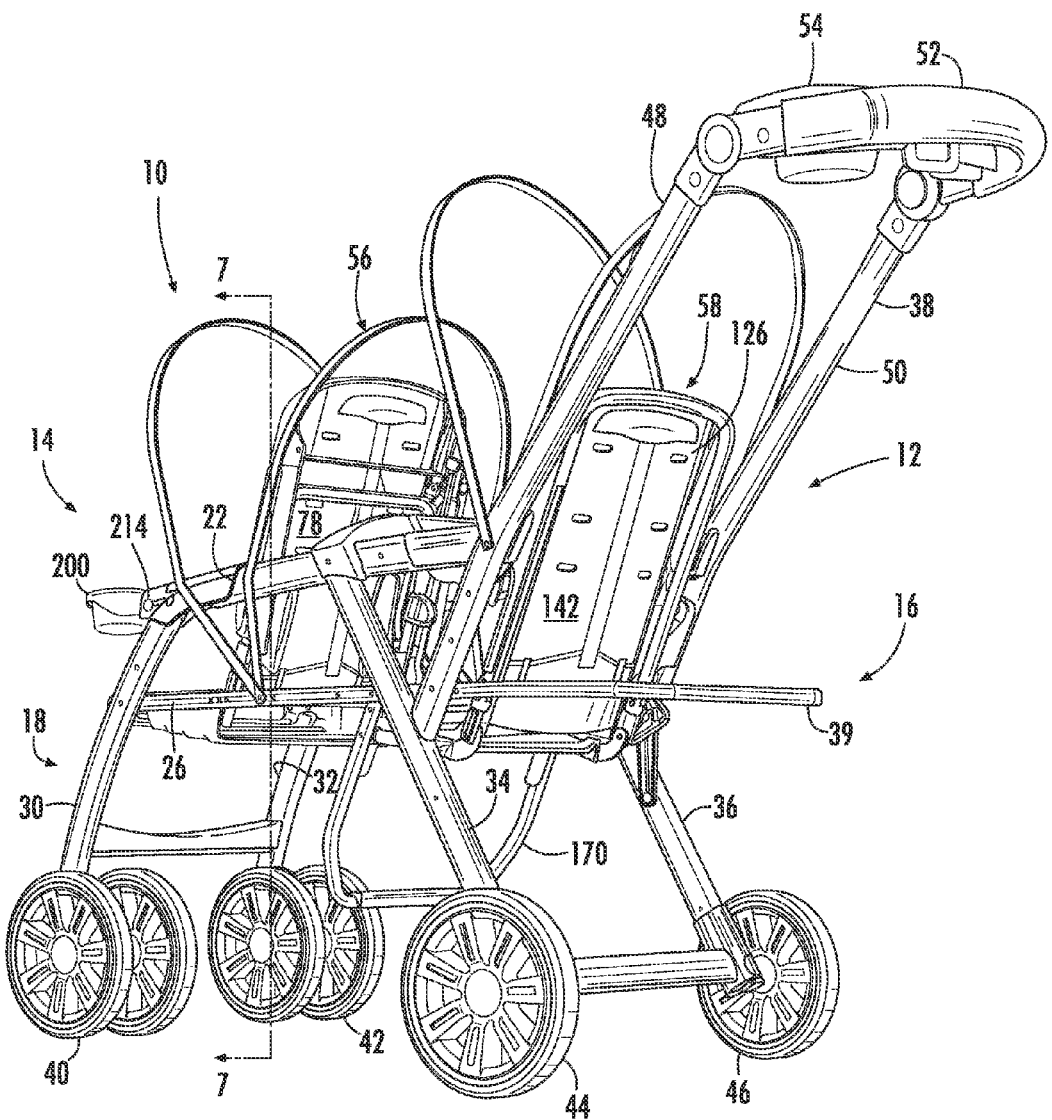
FIG. 2 is a rear perspective view of the stroller of FIG. 1.
Figure 3:
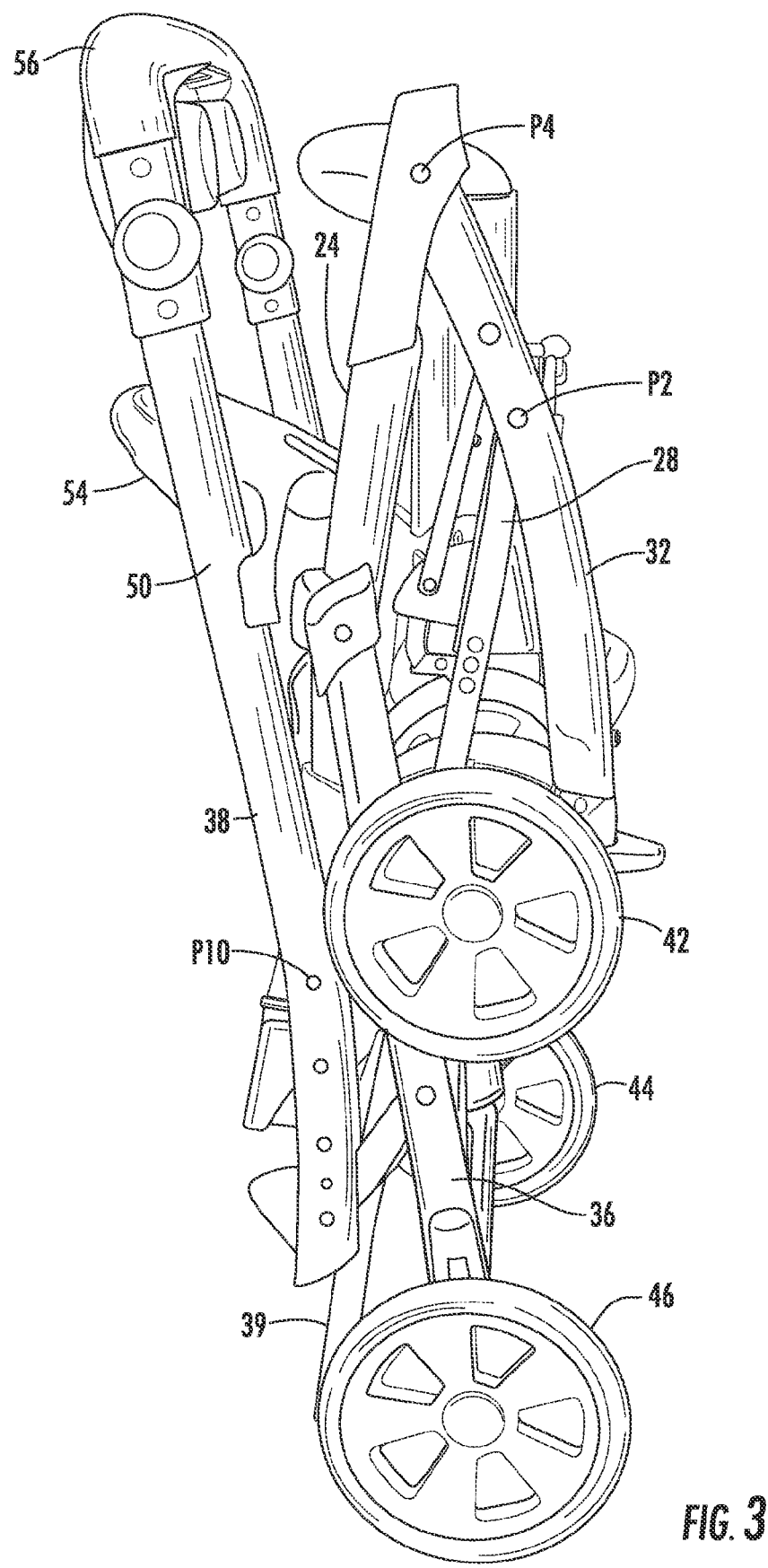
FIG. 3 is a side view of the stroller of FIG. 1 in a collapsed position.

The stroller 10 of the present invention generally includes a frame 12 that converts between an operating or use position (FIGS. 1 and 2) and a folded or collapsed position for storage or stowing (FIG. 3). Referring to FIGS. 1 and 2, the stroller frame 12 preferably has a front end 14, a rear end 16, and left and right sides 18, 20. The frame 12 has a left and right upper horizontal support rails 22, 24, left and right lower horizontal support rails 26, 28, left and right front legs 30, 32, left and right rear legs 34, 36, and a handlebar assembly 38. A basket frame 39 can also be formed at the rear end 16 of the frame 12 to permit storage of articles. The basket frame 39 is preferably U-shaped and extends from the lower horizontal support rails 26, 28. Wheel assemblies 40, 42, 44, 46 are connected at the bottom of legs 30, 32, 34, and 36, respectively. For exemplary purposes only, FIG. 2 illustrates front wheel assemblies 40,42 having a double wheel configuration and rear wheel assemblies 44, 46 having a single wheel configuration. However, it should be understood that any of the wheel assemblies 40, 42, 44, 46 can be provided with either a single or double wheel configuration.

Referring to FIGS. 1 and 3, the front legs 30, 32 are preferably attached to the lower horizontal support rails 26, 28 at pivot points P1, P2 and are also attached to the upper horizontal support rails 22, 24 at pivot points P3, P4. The rear legs 34, 36 are preferably connected to the upper horizontal support rails 22, 24 at pivot points P5, P6.

The handlebar assembly 38 preferably includes left and right arms 48, 50 and a push bar 52 connected to the left and right arms 48, 50. The push bar 52 can be immovably connected to the left and right arms 48, 50 or the push bar 52 can be connected to a pair of pivot assemblies 53, 55 which permits the push bar 52 to rotate about the left and right arms 48, 50, as shown in FIGS. 1, and 4-6, to a desired operator position. An acceptable pivot assembly for a handlebar is disclosed in U.S. Patent Publication No. 2005/0242549 (see FIGS. 3-5), which disclosure is incorporated herein by reference as if fully set forth.

The left and right arms 48, 50 are preferably connected to the lower horizontal support rails 26, 28 at pivot points P7, P8 and are also connected to the upper horizontal support rails 22, 24 at pivot points P9, P10. The left and right arms 48, 50 are secured to the left and right rear legs 34, 36 when the stroller 10 is in an operating position to prevent the handlebar assembly 38 from moving about pivot points P7, P8, P9, or P10. When a user desires to move the stroller 10 into a collapsed position, the left and right arms 48, 50 are unsecured from the left and right rear legs 34, 36 and moved about pivot points P7, P8, P9, and P10 to place the stroller 10 in a collapsed position. The stroller 10 of the present invention can be secured to the left and right handlebar arms 48, 50 to the rear legs 34, 36 with known mechanisms including, but not limited to, the rail connector and plunger arrangement disclosed in U.S. Patent Pub. No. 2005/0242549 (see FIGS. 9, 10) or the latch assembly disclosed in U.S. Pat. No. 6,155,740 (see FIGS. 1-12), which disclosures are incorporated herein by reference as if fully set forth.

Figure 4:
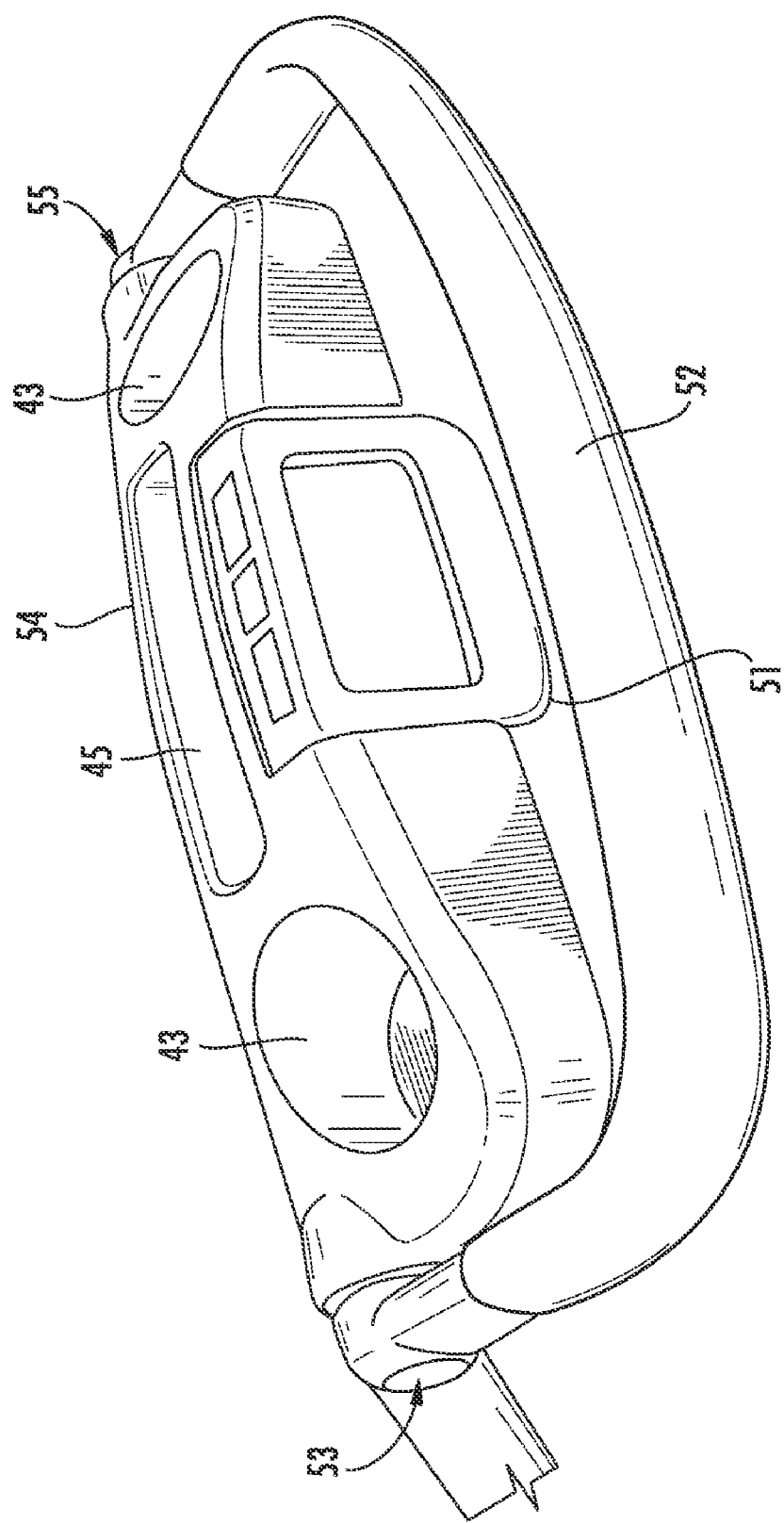
FIG. 4 is a perspective view of a first embodiment of a parent tray having a collapse control.
Figure 5:
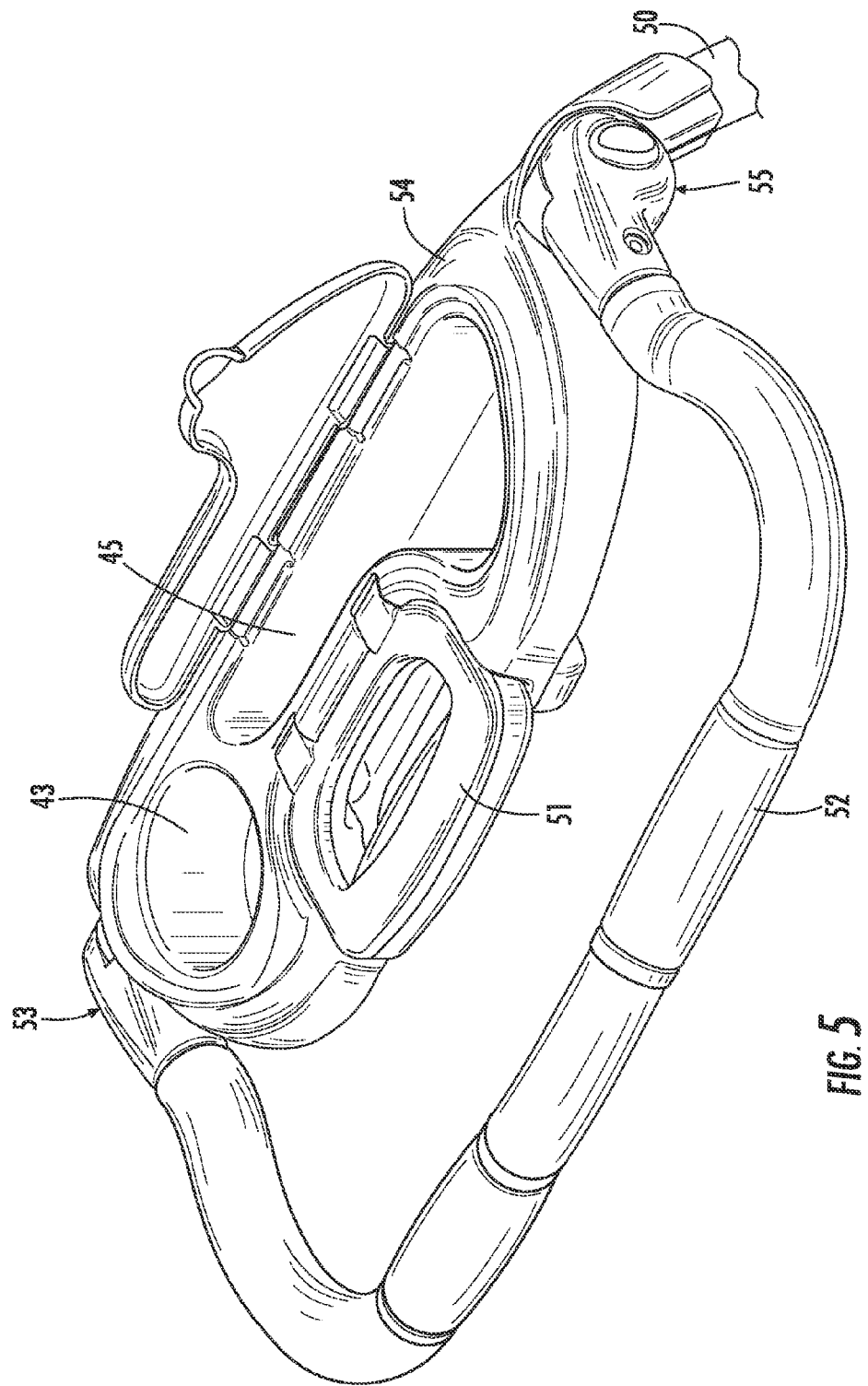
FIG. 5 is a perspective view of a second embodiment of a parent tray having a collapse control.
Figure 6:
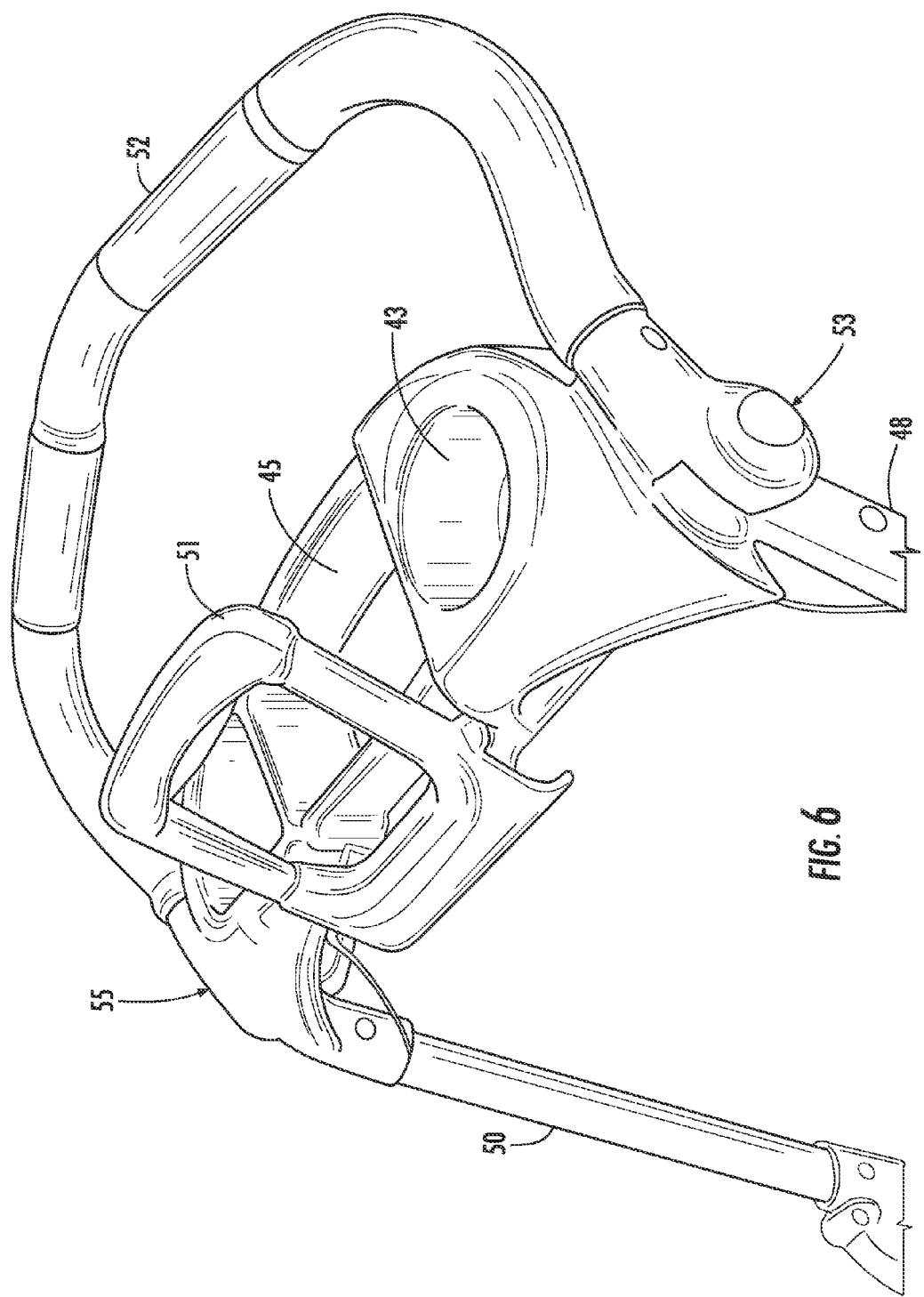
FIG. 6 is a perspective view of a third embodiment of a parent tray having a collapse control.

As shown in FIGS. 2 and 4-6 a parent tray 54 can be mounted between the left and right arms 48, 50. The parent tray 54 can take on numerous configurations without departing from the sprit of the invention. One preferred configuration is shown in FIG. 4, and FIGS. 5 and 6 show two alternative preferred configurations. The parent tray 54 can include one or more cup holders 43 and a compartment 45 to hold small objects, such as money, keys, cellular phones, etc. The parent tray 54 can also include a control 51 to remotely actuate the securing mechanism between the handlebar arms 48, 50 and the rear legs 34, 36. A non-limiting example of a parent tray 54 having such a control 51 is disclosed in of U.S. Patent Pub. No. 2005/0242549 (see FIGS. 3, 6-9), which disclosure is incorporated herein by reference as if fully set forth. The control 51 for remotely actuating the securing mechanism between the handlebar arms 48, 50 and the rear legs 34, 36 can alternatively be mounted to the handlebar arms 48, 50, such as that disclosed in U.S. Patent Pub. No. 2009/0127828 (FIGS. 5-12) or U.S. Pat. No. 5,938,229 (see FIGS. 1-8), which disclosures are incorporated herein by reference as if fully set forth.

Figure 27:
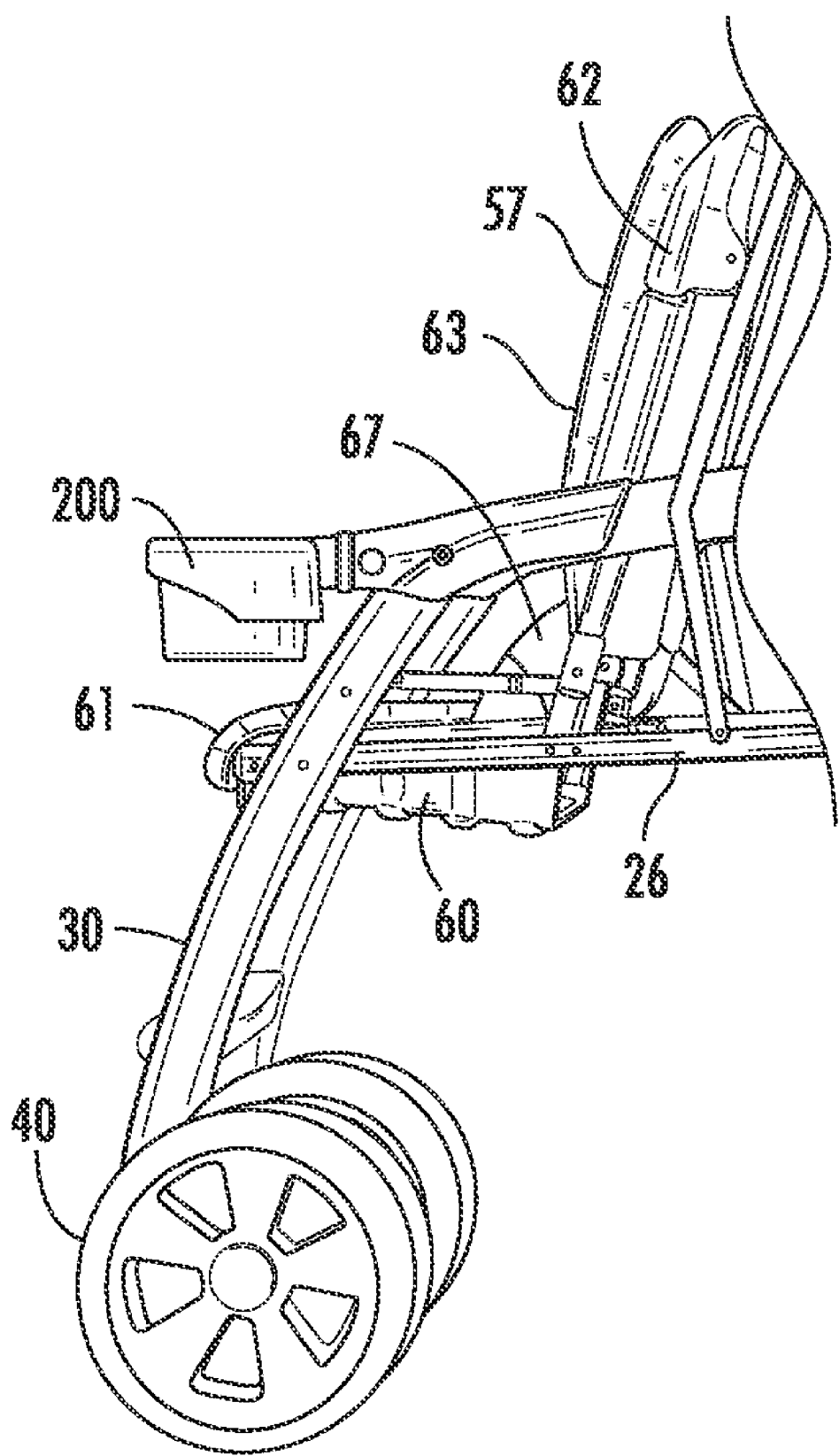
FIG. 27 illustrates a fragmentary view showing the front seat assembly of the stroller of FIG. 1, with a seat cushion disposed thereon.

As shown in FIGS. 1, 2, 7, 8, 10, 16, 19, and 21 the stroller 10 of the present invention can be a tandem stroller 10, which preferably includes a front seat assembly 56 mounted to the front portion of the frame 12 and a rear seat assembly 58 mounted to the rear portion of the frame 12. The front and rear seat assemblies 56, 58 may each be provided with a cushion 57 (FIG. 27). The front seat assembly 56 includes a seat base 60, a seat back 62, and left and right seat adjustment assemblies 64, 66. One of ordinary skill in the art will appreciate that only one adjustment assembly is required, but two are provided in accordance with the preferred embodiment of the present invention. The seat back 62 includes a seat back frame 68 and seat back support 70. The seat base 60 has an upper surface 72 and a lower surface 74, and the seat back support 70 has a front surface 76 and rear surface 78. In a preferred embodiment, the seat base 60 is mounted on the left and right lower horizontal support rails 26, 28, and the seat back frame 68 is connected to the left and right horizontal support rails 26, 28 at pivot points P11, P12.

Figure 10:
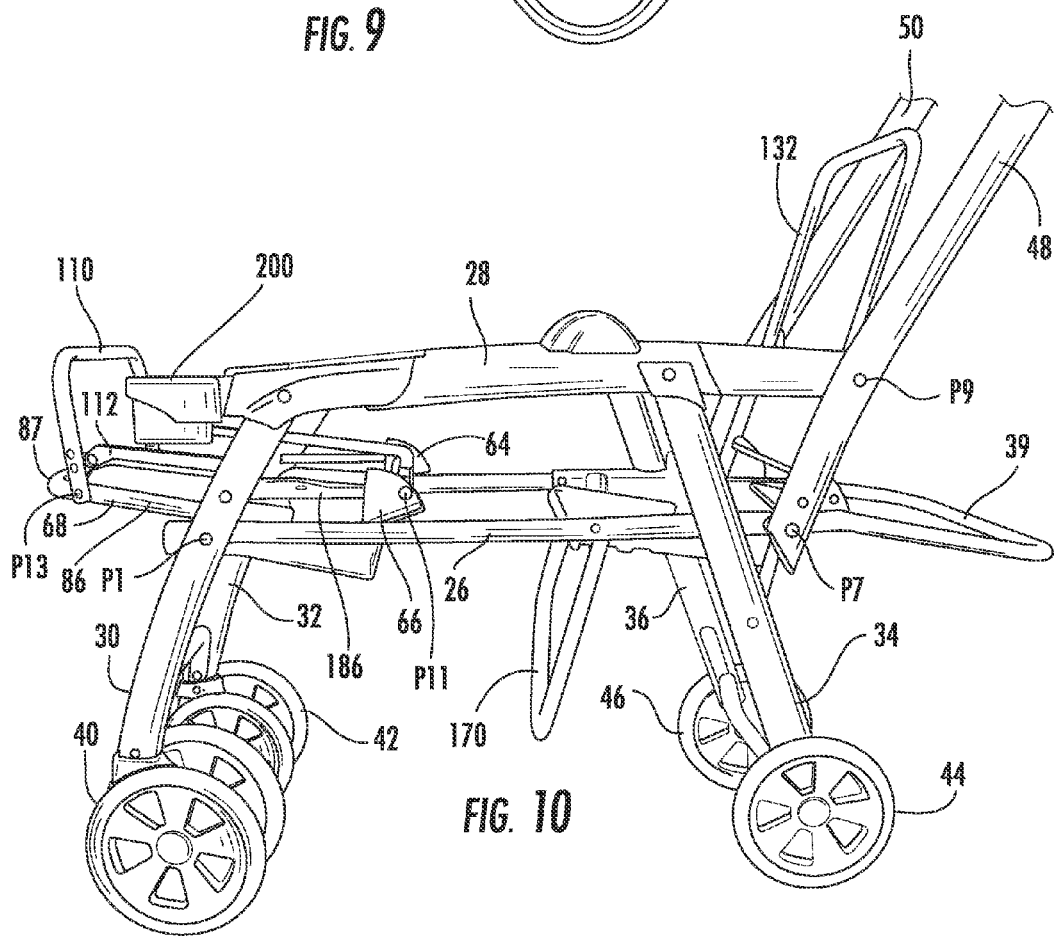
FIG. 10 is a perspective view of the stroller of FIG. 1 with the front seat back frame in a travel seat support position and the rear seat back frame in a back support position.
Figure 11:
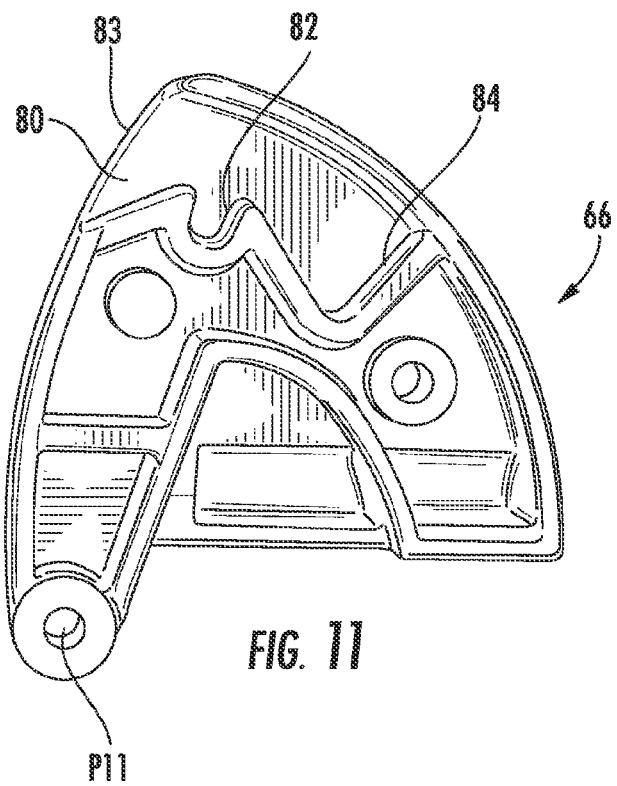
FIG. 11 illustrates the right front seat adjustment assembly of FIG. 8.

Referring to FIGS. 8, and 10-15, the left and right seat adjustment assemblies 64, 66 for adjusting the position of the seat back 62 are connected to the left and right lower horizontal support rails 26, 28. The left and right adjustment assemblies 64, 66 are substantially mirror images, and only the right adjustment assembly 66 will be described for convenience. As shown in FIG. 11, the right adjustment assembly 66 preferably includes a track 80 having an open front end 83 and a closed end 84. The track 80 extends in a generally arc-shaped path, and at least one groove 82 is extends in a generally radially inward direction from the path of the track 80.

Figure 14:
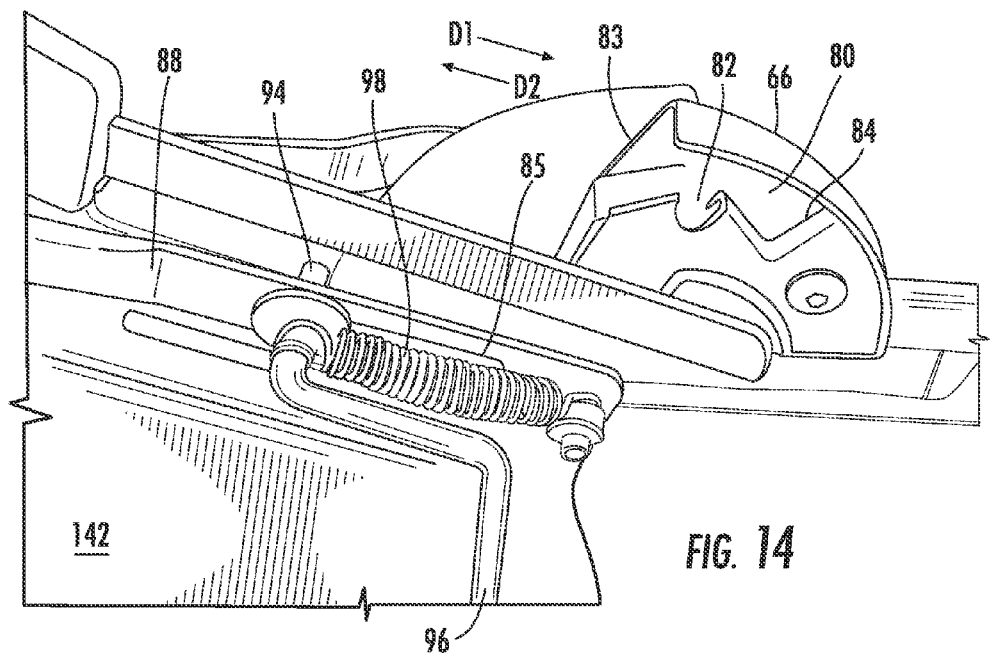
FIG. 14 shows an enlarged detail of the front seat adjustment assembly of FIG. 13.
Figure 15:
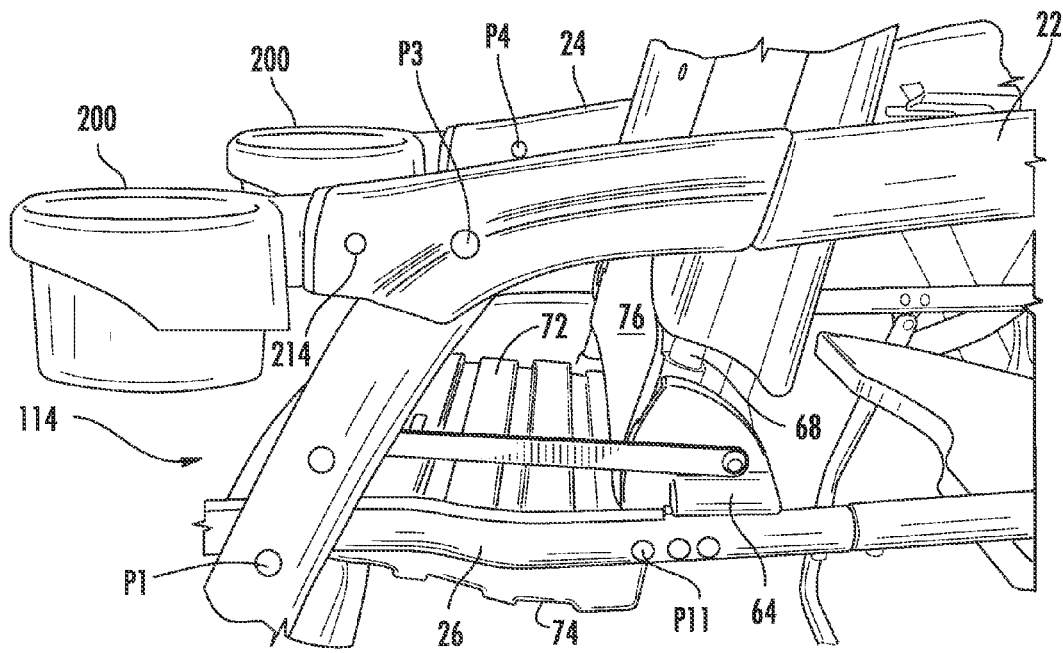
FIG. 15 is fragmentary perspective view of the front seat attachment assembly of FIG. 1.

The seat back frame 68 is preferably U-shaped and includes a cross bar 87 extending between left and right seat frame members 86, 88. As best shown in FIG. 14, slots 85 are defined in the left and right seat frame members 86, 88, and a guide bar 96 extends across the seat back frame 68 and through the slots 85, 89. Additional slotted guides 90, 92 may be formed in the seat back frame 68, with the guide bar 96 extending therethrough, to further support and retain the guide bar 96 against the seat back frame 68. Ends 94 of the guide bar 96 extend outside of the slots 85, 89. The guide bar 96 slides in directions D1 and D2 within the slots 85, 89 and guides 90, 92 to move the ends 94 in direction D1 and D2. A biasing member 98, which is preferably a coiled spring, biases the guide bar 96 and its ends 94 in direction D1.

Figure 13:
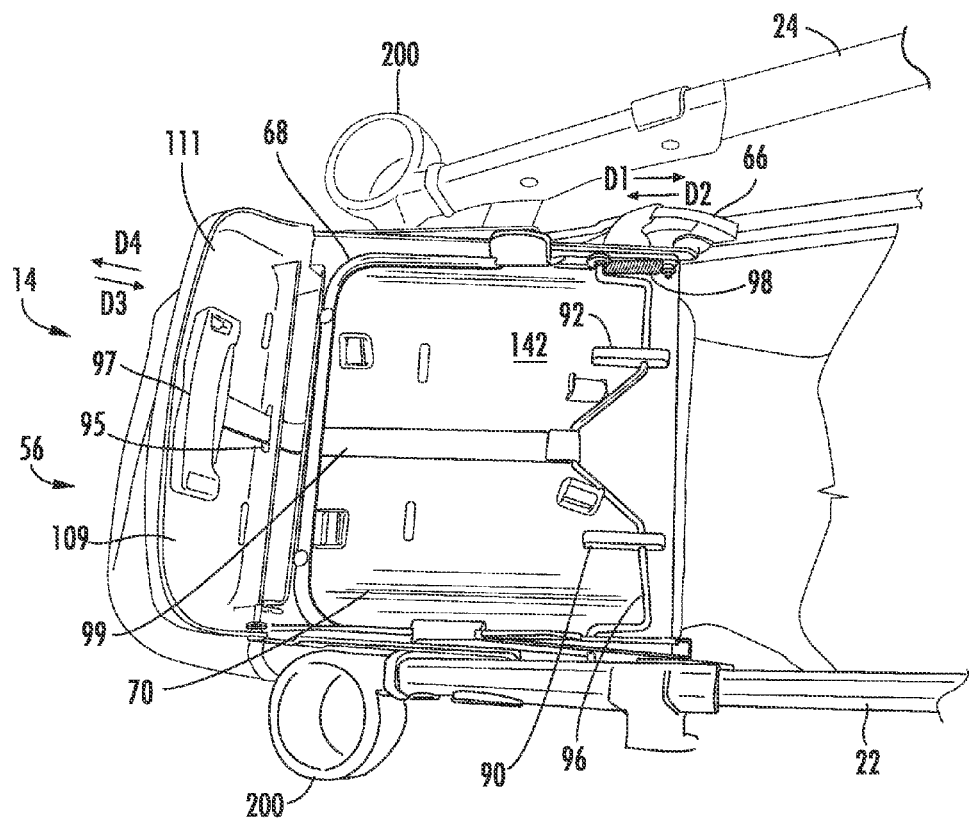
FIG. 13 is a top view of the stroller of FIG. 1, showing the front seat assembly and the seat back in a travel seat support position.

Referring to FIG. 13, an operator control, in the form of a grip 97 in the illustrated embodiment, is provided on the head support assembly 109. The grip 97 is slidably mounted to the seat back frame 68 by any means known in the art, such as engagement of grooves formed in the grip 97 with a track formed in the seat back frame 68. A linkage 99, which is in the form of a fabric strip in the embodiment shown, is affixed between the grip 97 and the guide bar 96. One of ordinary skill in the art would recognize that the linkage 99 can be made from any type of suitable material, including, without limitation, a cable, webbing, chain, etc. The seat back frame 68 may include one or more slots 95 or others guide means to retain the linkage 99 against the seat back 68.

To adjust the position of the seat frame 62, the grip 97 is pulled in direction D4. When the grip 97 moves in direction D4, it pulls the linkage 99, which pulls on the guide bar 96, moving it and its ends 94 in direction D2, against the bias of the springs 98. This positions the guide bar ends 94 within the track 80, permitting them to move freely along the track 80, and the seat back 62 to pivot with respect to the seat base 60. When the grip 97 is released, the bias of the springs 98 pulls the guide bar 96 and ends 94 in direction D1, causing the linkage 99 to pull the grip 97 back in direction D3.

Figure 8:
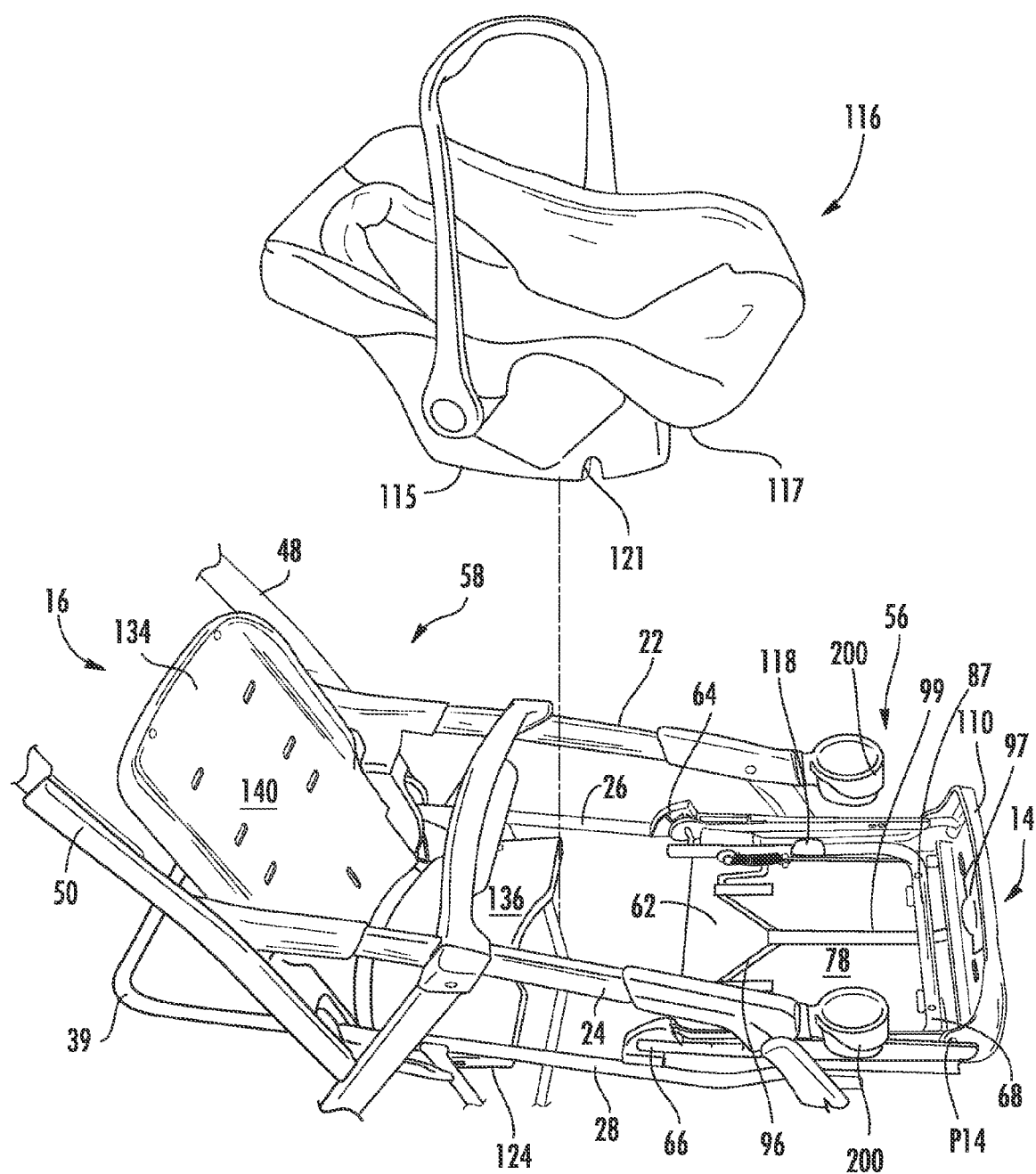
FIG. 8 is a fragmentary perspective view the stroller of FIG. 1 with the front seat back folded into the travel seat support position and a travel seat positioned for mounting of the stroller.

The engagement between the seat adjustment assemblies 64, 66 and guide bar ends 94 retains the seat back 62 in any one of a plurality of back support positions or a travel seat support position. The plurality of back support positions include an upright position in which the seat back 62 is substantially perpendicular to the seat base 60 and one or more recline positions in which the seat back 62 is positioned at an obtuse angle to the seat base 60. In the embodiment shown, the seat back 62 can be retained in a forward folded or travel seat support position where the seat back 62 is substantially parallel to and above the seat base 60 and the front surface 76 of the seat back support 70 is adjacent the upper surface 72 of the seat base 60 as shown in FIGS. 8, 10, and 13, when the guide bar end 94 is moved to a position completely outside of the track 80. When the seat back 62 is moved to the travel seat support position, the guide bar ends 94 are removed from track 80 via open end 83 of the seat adjustment assemblies 64, 66. In an alternate embodiment of the seat adjustment assembly 66 shown in FIG. 12, the open front end is replaced with a second closed end 100. Engagement of the guide bar ends 94 with the second closed end 100 corresponds with the travel seat support position of the seat back 62.

Figure 7:
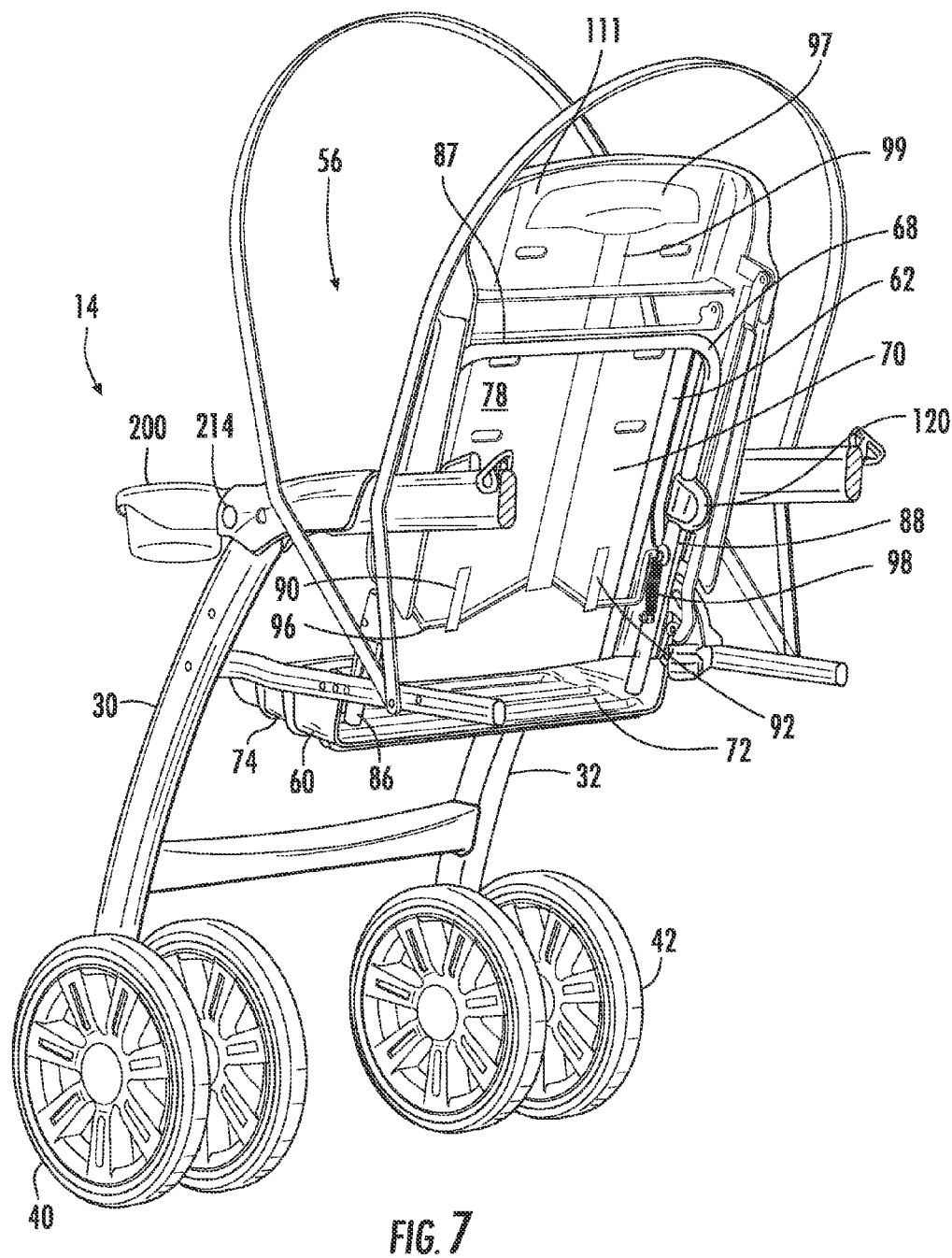
FIG. 7 is a sectional view of the front portion of the stroller taken along line 7-7 in FIG. 2.

Positioning of the guide bar end 94 within the groove 82 retains the seat back 62 in a substantially upright back support position as shown in FIGS. 1, 2, and 7. Although only one groove 82 is shown in FIG. 11, one of ordinary skill in the art will understand that multiple grooves 82 could be used to correspond with multiple partially reclined back support positions of the seat back 62. The guide bar ends 94 can be positioned within the closed ends 84 of the seat adjustment assemblies 64, 66 to fully recline the seat back 62. In any of the seat positions described above, the bias of the spring 98 retains the guide bar end 94 in its selected position, until the grip 97 is actuated, pulling the end 94 out of its position and back onto the track 80 to permit pivoting of the seat back 62 to another position.

The front and rear seat assemblies 56, 58 are preferably provided with cushions 57. FIG. 27 shows the cushion 57 of the front seat assembly 56, which is preferably configured to permit adjustment of the seat back 62 without interference from or damage to the cushion 57. The cushion 57 includes a base portion 61 that covers the seat base 60 and a back portion 63 that covers the seat back and is pivotally joined to the seat base portion 61, permitting the cushion 57 to fold with the seat assembly 56 when the seat back 62 is moved into travel seat support position. The cushion 57 also includes side panels 67. Left side panel 67 is shown in detail in FIGS. 28 and 29, but the cushion 57 preferably includes a right side panel that is a mirror image thereof. As shown, side panel 67 is positioned at the left side of the seat cushion 57, connecting the portions of the left side edges of the base portion 61 and back portion 63. In the embodiment shown the side panel 67 has a curved edge 71 extending between the base portion 61 and the back portion 63, and a fold 73 extends from the point of the side panel 67 in contact with the seat cushion fold 65 to an approximate midpoint of the curved edge 71, dividing the side panel into a first portion 75 and a second portion 77.

Figure 28:
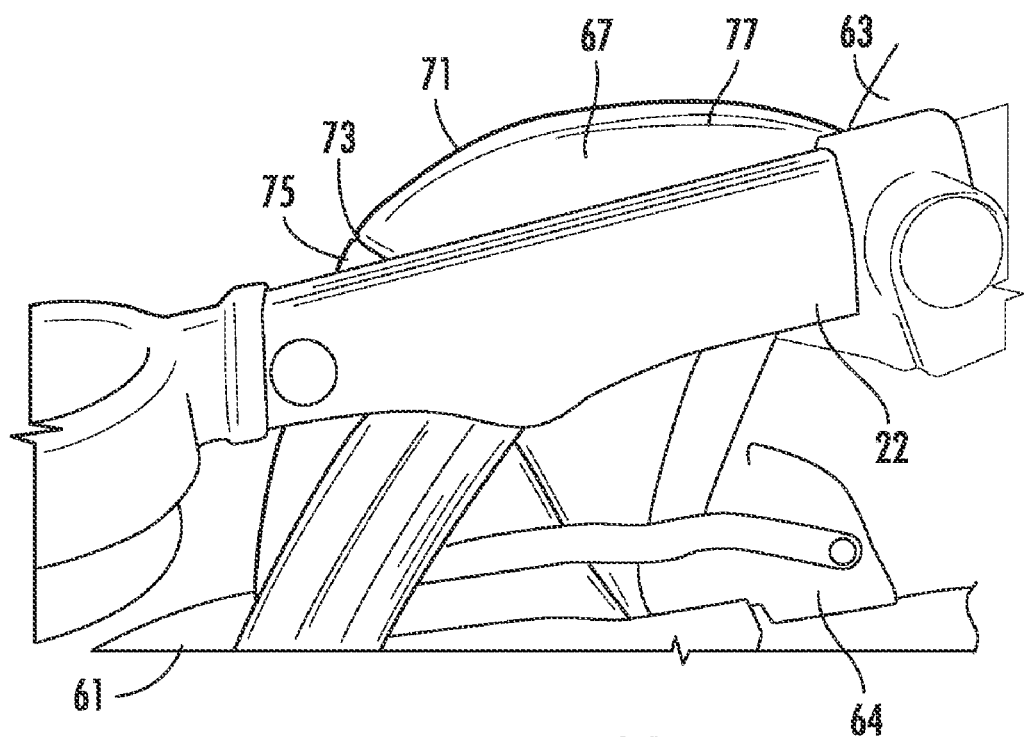
FIG. 28 shows an enlarged detail of the cushion side panel of FIG. 27.
Figure 29:
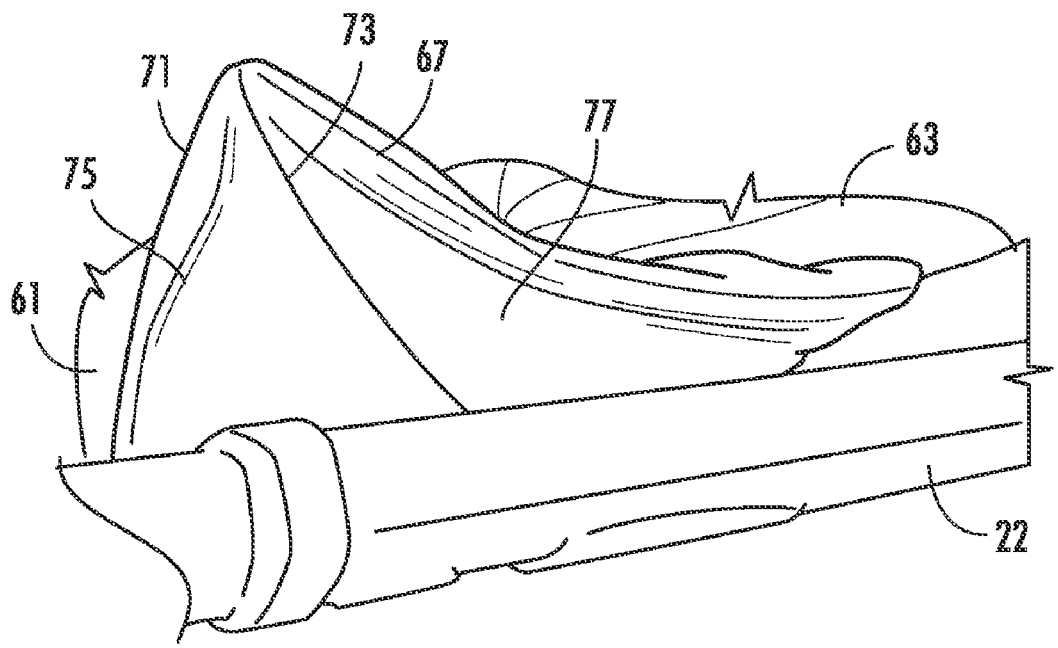
FIG. 29 shows the cushion side panel of FIG. 27 in a partially folded state.

When the seat back 62 is pivoted to move the front seat assembly 56 between the travel seat support and one of the plurality of back support positions, the side panel 67 folds and unfolds at the fold 73. Specifically, while the seat back 62 is pivoted forward to move the seat assembly 56 into the travel seat support position, the side panel 67 folds at the fold 73 and collapses inward with respect to the seat assembly 56, as shown in FIG. 29. When the seat back 62 is pivoted backwards to move the seat assembly 56 into one of the back support positions, the side panel 67 unfolds and expands until the first and second portions 75, 77 are substantially parallel, as shown in FIG. 28. This configuration permits the side panel 67 to fold neatly between the seat back 62 and the seat base 60 without interfering with the seat adjustment assembly 64 when the front seat assembly 56 is in the travel seat support position. It should be understood that the rear seat assembly 58 can be provided with a cushion having a similar configuration.

Figure 17:
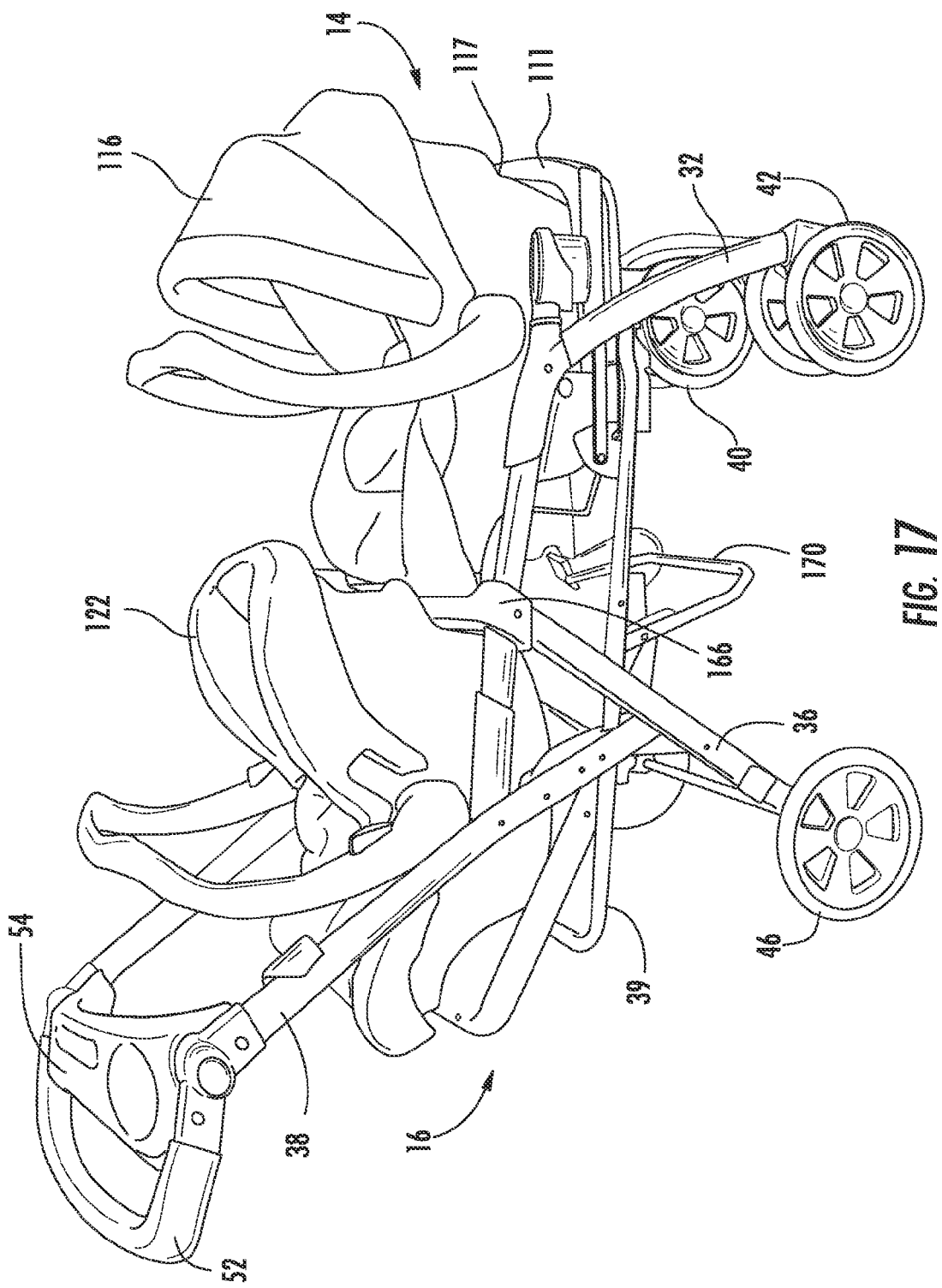
FIG. 17 is a perspective view of the stroller of FIG. 1 with a pair of child travel seats attached.
Figure 18:
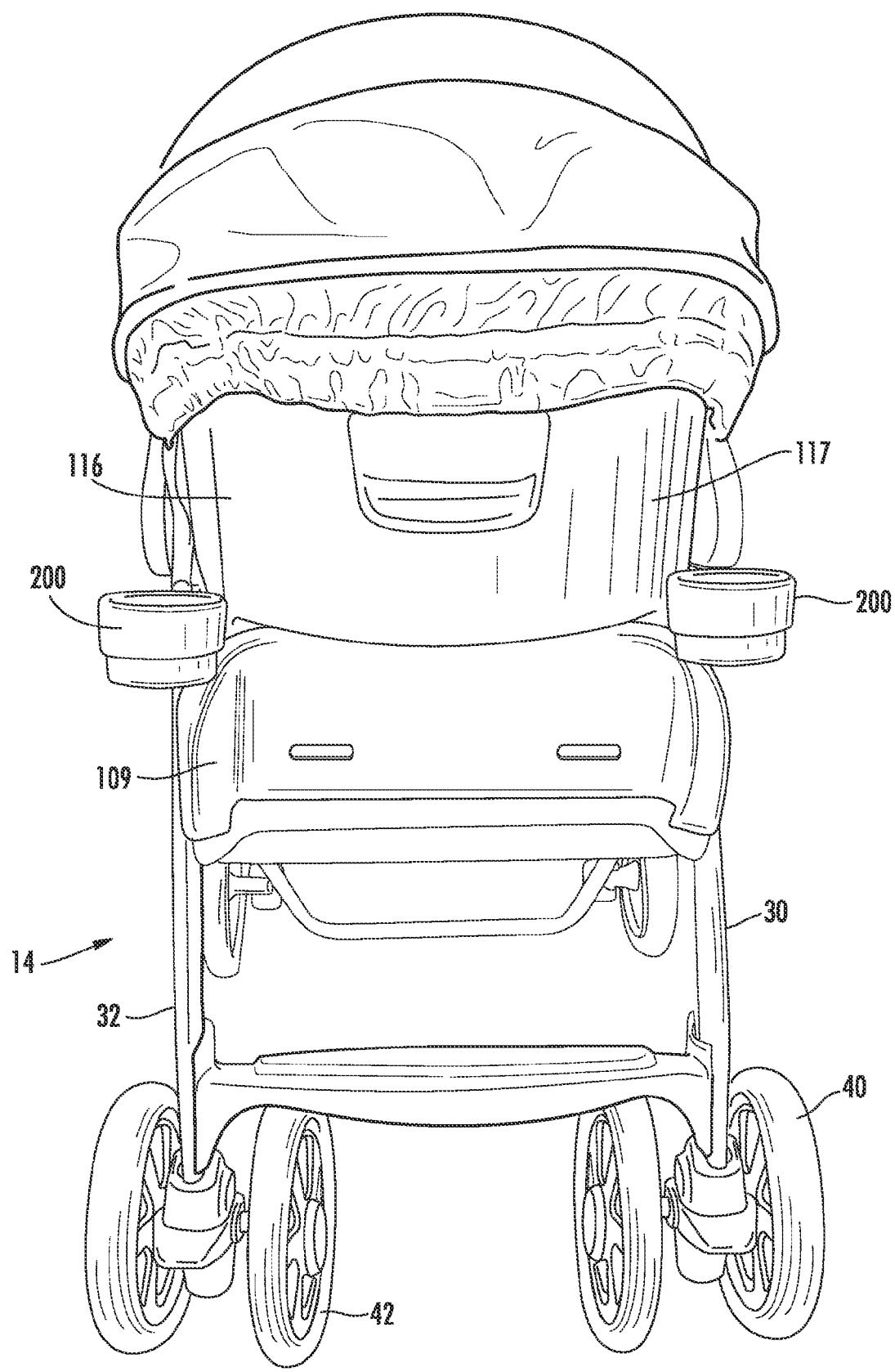
FIG. 18 is a rear plan view of the stroller of FIG. 17.

A head support assembly 109 is preferably attached to the seat back frame 68. As shown in FIGS. 8 and 10, the head support assembly 109 includes a U-shaped head support frame 110 and a shell 111 mounted to the head support frame 110. Preferably, the head support frame 110 is connected to left and right members 86, 88 of the seat back frame 68 at pivot points P13, P14. Left and right links 112, 114 each have a first end pivotally connected to the head support frame 110 and a second end pivotally connected to the left and right lower horizontal support rails 26, 28, respectively. The ends of links 112, 114 are preferably L-shaped. When the seat back 62 is in a substantially upright back support position (i.e., approximately 90° relative to the seat base 60), the head support frame 110 is substantially in the same plane as the seat back 62 (FIGS. 1, 2, 7, and 16). When the seat back 62 is rotated toward the front end 14 of the frame 12 to the travel seat support position, the head support frame 110 moves about pivot points P13, P14 to a position substantially perpendicular to the seat back 62 (FIGS. 8 and 10). Shell 111 is rotatable about pivot points P13 and P14 along with the head support frame 110. When the seat back 62 is in the travel seat support position, the head support frame 110 and shell 111 in their pivoted positions form a front barrier which, as explained hereinafter, assists with mounting a child travel seat 116 (FIGS. 8, 17, and 18).

As shown in FIGS. 7, 8, and 10, left and right travel seat mounts 118, 120 are attached to left and right seat back frame members 86, 88, respectively. The left and right travel seat mounts 118, 120 are preferably mounted to extend away from the rear surface 78 of the seat back support 70. When the seat back 62 is in the travel seat support position, the left and right travel seat mounts 118, 120 can engage a mating securing member on a child travel seat 116. In a preferred embodiment of the invention, each of the travel seat mounts 118, 120 forms a securing wall with which forms a secure connection with a spring biased flipper 121 (FIG. 8) on a child travel seat 116. A non-limiting example of such a mating securing device is disclosed in U.S. Patent Pub. No. 2005/0264062 (see FIG. 41), which disclosure is incorporated herein by reference as if fully set forth. Alternatively, the securing wall and flipper assembly can be reversed such that the stroller has the spring biased flipper and the travel seat has the securing wall.

As shown in FIGS. 8, and 16-18, when a child travel seat 116 is mounted to the front end 14 of the stroller 10, a base portion 115 of the seat 116 can rest on the rear surface 78 of the seat back support 70, and the head support frame 110 and shell 111 of the front seat assembly 56 form a front barrier to restrict forward movement of the travel seat 116. In addition, a rear portion 117 of the travel seat 116 can rest on shell 111 of the head support assembly 109 in order to further support and maintain the travel seat 116 in an upright orientation.

One of ordinary skill in the art will recognize that the front seat assembly 56 described above could be used in combination with a single child stroller (FIG. 24), a tandem stroller (i.e., double seat stroller), or a sit and stand stroller. The following text further describes a tandem stroller 10 according to the present invention.

Referring to FIGS. 1, 2, 8, and 15, the rear seat assembly 58 of the present invention preferably includes a rear seat base 124, a rear seat back 126, and left and right rear seat adjustment assemblies 128, 130. While two adjustment assemblies are described, one of ordinary skill in the art will appreciate that only one adjustment assembly is required in accordance with the present invention. The rear seat back 126 includes a seat back frame 132 and seat back support 134. The rear seat base 124 has an upper surface 136 and a lower surface 138, and the rear seat back support 134 has a front surface 140 and a rear surface 142. The rear seat back frame 132 is connected to the left and right lower horizontal support rails 26, 28 at pivot points P15, P16 (see FIG. 20) to allow the rear seat back 126 to be movable relative to the lower horizontal support rails 26, 28.

Figure 9:
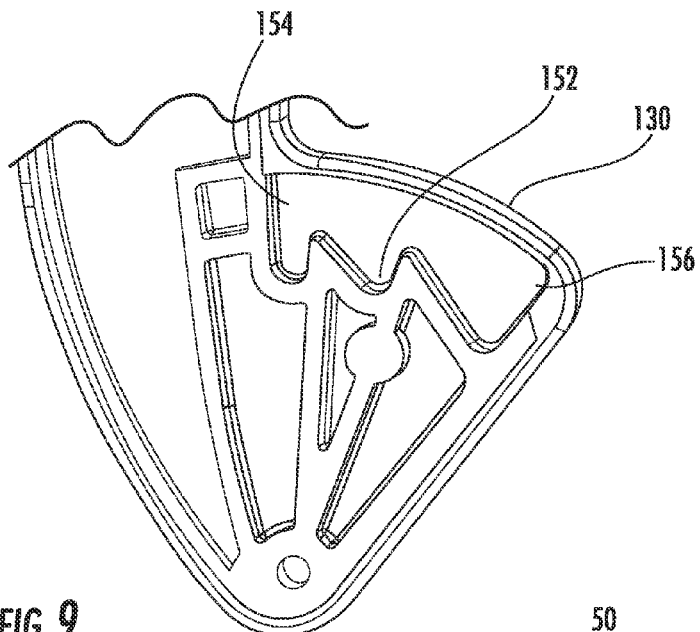
FIG. 9 illustrates the rear seat adjustment assembly of the stroller of FIG. 1.
Figure 19:
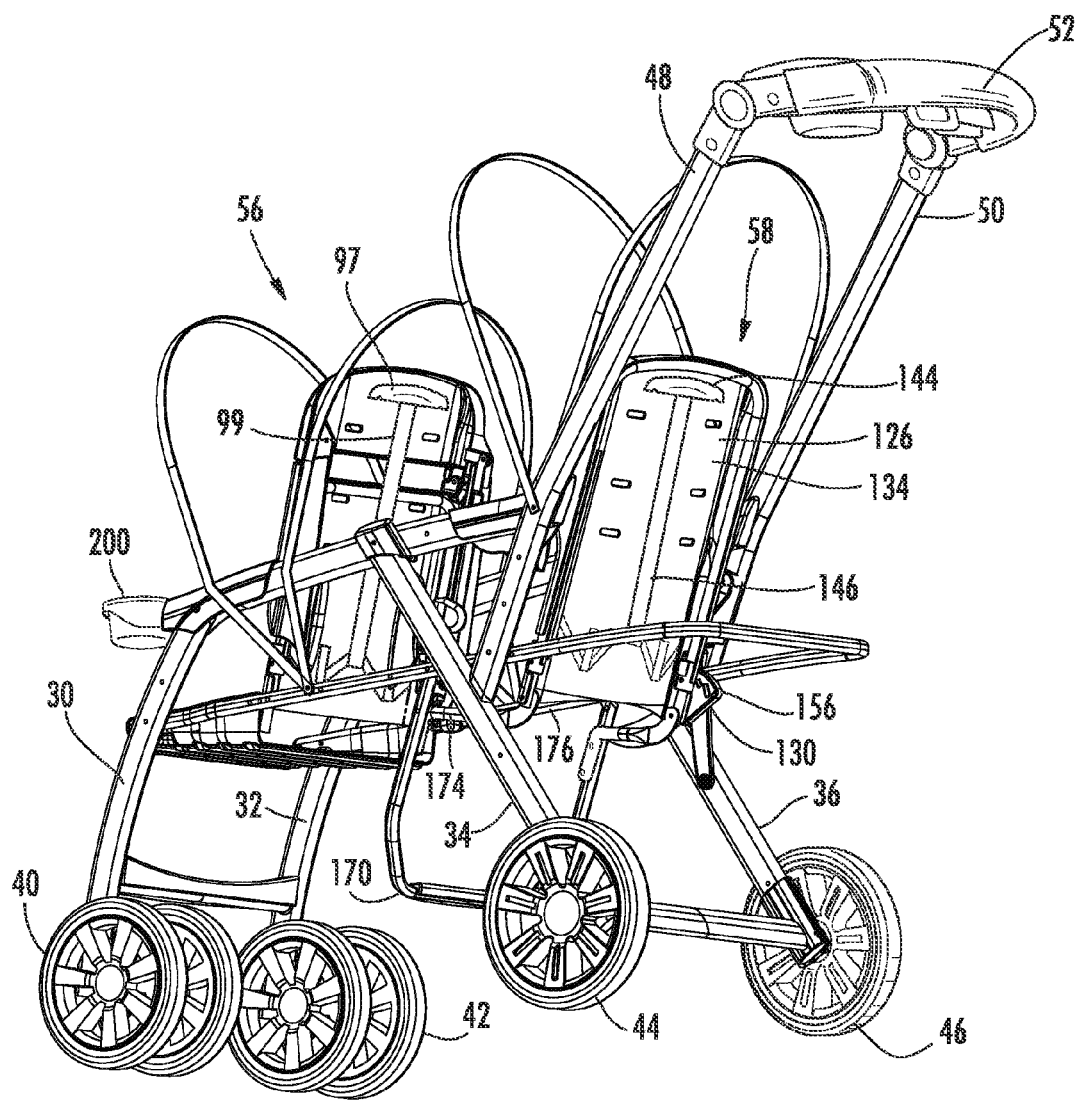
FIG. 19 is a perspective view the stroller as shown in FIG. 2, with the rear seat base pan removed.
Figure 20:
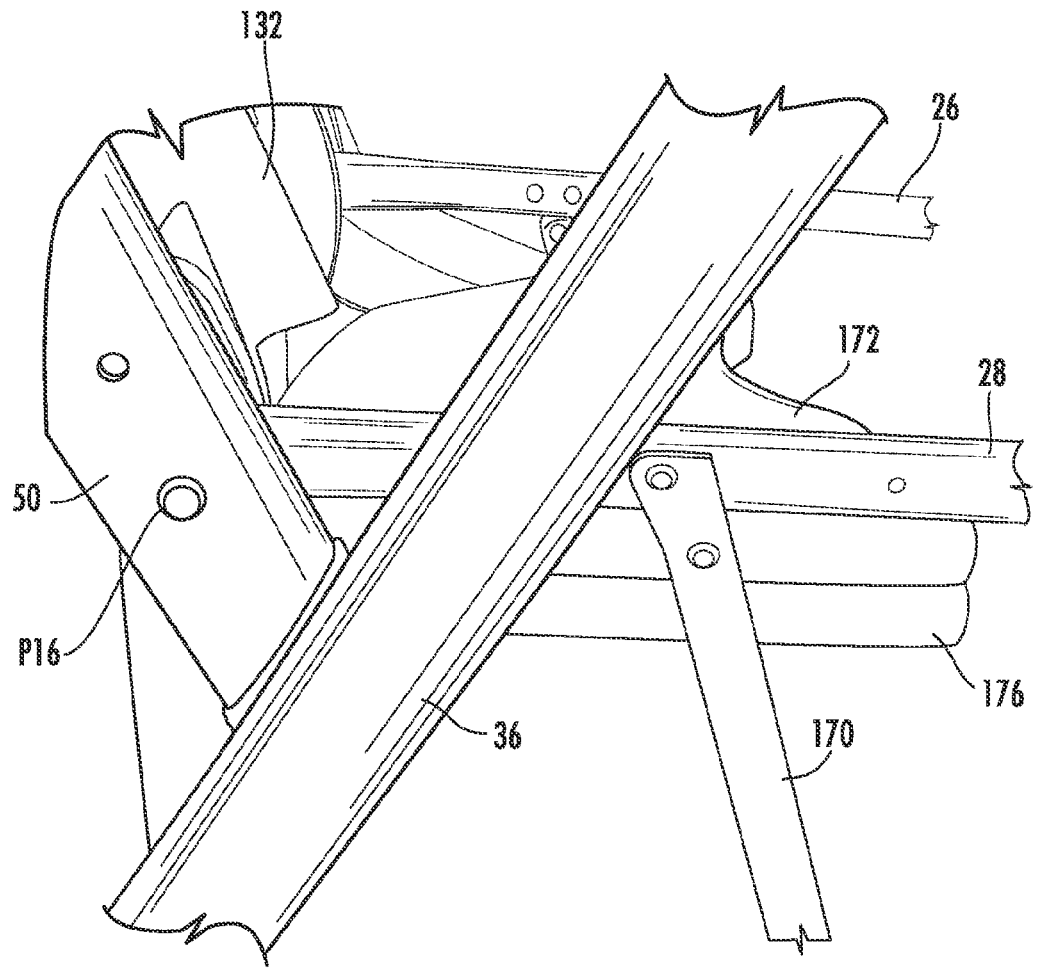
FIG. 20 is a fragmentary perspective view of the stroller of FIG. 1, illustrating the right side attachment between the rear seat and frame when the stroller is in an operating position.
Figure 21:
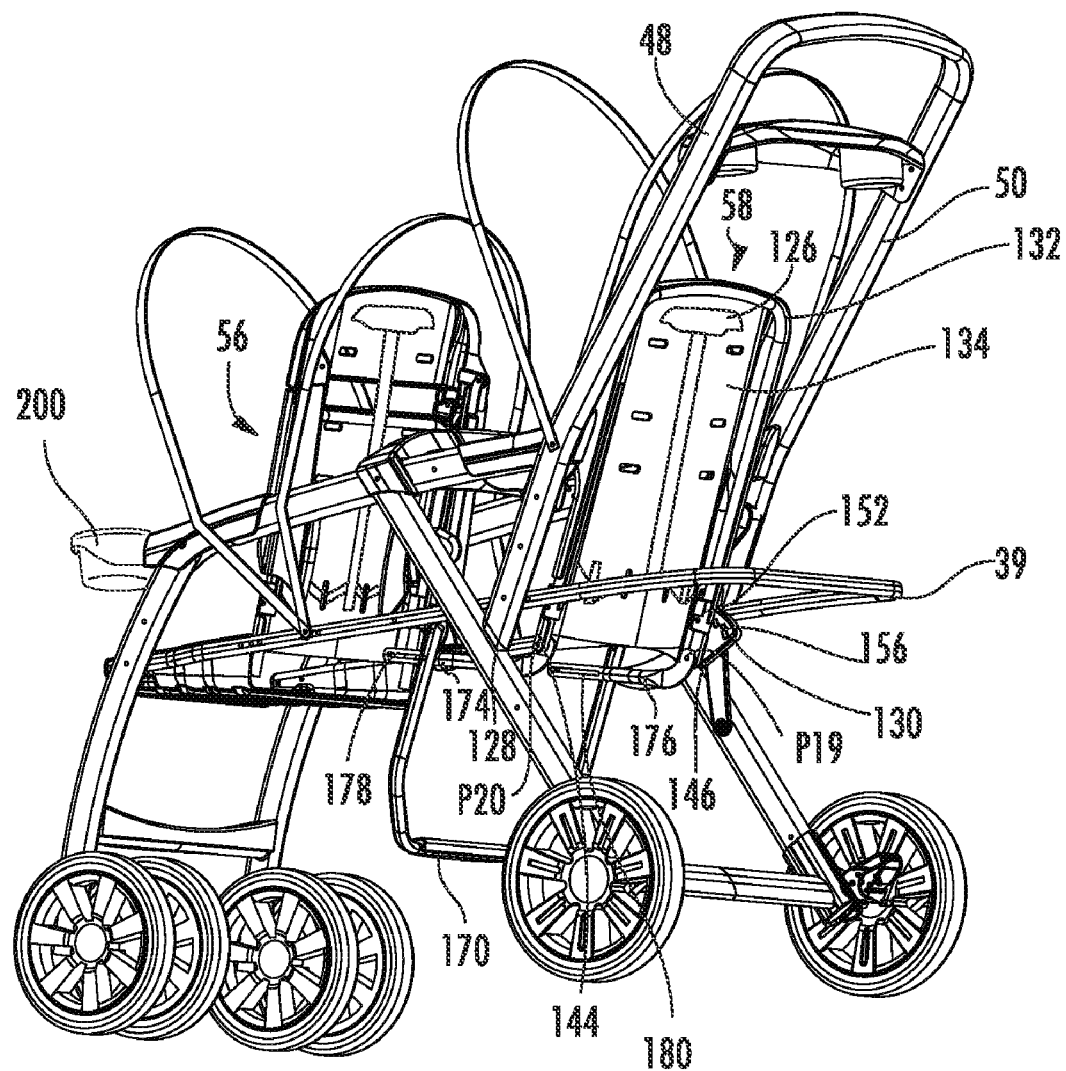
FIG. 21 is a perspective view of an alternative embodiment of the stroller of the present application, with the rear seat pan removed.

Referring to FIGS. 19 and 21, the rear seat assembly 58 includes right and left adjustment assemblies 128, 130 to adjust the rear seat back 126 from a substantially upright back support position (i.e., substantially perpendicular to the rear seat base 124 as shown in FIGS. 19 and 21) through one or more reclined back support positions (FIG. 17). A left seat adjustment assembly 130 is shown in detail in FIG. 9, but it should be understood that the right seat adjustment assembly 128 would be a mirror image thereof. As shown in FIG. 19, the rear seat assembly 58 is provided with a grip 144, linkage 146, and guide bar 148 having ends biased to removably engage one or more grooves 152 in the rear seat adjustment assemblies 128, 130 in the same manner as the guide bar 96 assembly described above with respect to the front seat assembly 56. The engagement between the rear seat adjustment assemblies 128, 130 and guide bar ends is substantially similar to that previously described with respect to the front seat assembly 56, with the exception that the rear seat adjustment assemblies 128, 130 preferably have two closed ends 154, 156 (as shown in FIG. 9) which permit the rear seat back 126 to be adjusted among a substantially upright back support position and one or more reclined back support positions. In an alternative embodiment, the rear seat adjustment assemblies 128, 130 could be identical to the front seat adjustment assemblies 64, 66, permitting the rear seat assembly 58 to pivot to a forward folded position similar to the travel seat support position of the front seat assembly 56.

Figure 16:
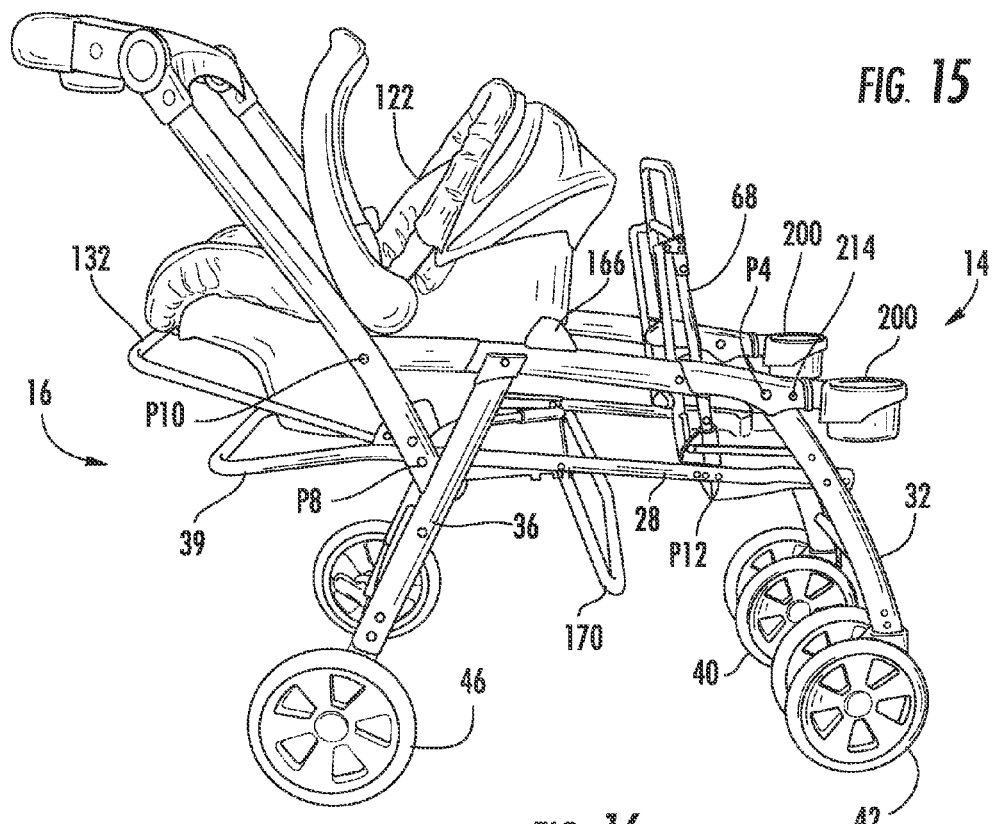
FIG. 16 is a perspective view of the stroller according to the present invention with a child travel seat attached at the rear end of the stroller.

As shown in FIG. 16, a second child travel seat 122 can be mounted to the rear end 16 of the stroller frame 12 adjacent the rear seat assembly 58 when the rear seat back 126 is in a reclined position. In addition, as shown in FIG. 17, a pair of child travel seats 116, 122 can be contemporaneously mounted to the front end 14 and rear end 16 of the stroller frame 12 of the present invention.

Left and right rear travel seat mounts 158 can be connected to lower horizontal support rails 26, 28 and are preferably mounted to extend away from the front surface 140 of the rear seat back support 134. FIG. 8 illustrates the right rear travel seat mount 158, but one of ordinary skill in the art will understand that the right travel seat mount is a mirror image thereof. When the rear seat back 126 is in a reclined position, the left and right travel seat mounts 158 can engage mating securing members, such as spring biased flippers, on a child travel seat 122 as described above with respect to the front seat assembly 56. One of ordinary skill in the art will recognize that the left and right travel seat mounts 158 can alternatively be connected to the upper horizontal support rails 22, 24 or another portion of rear end 16 of the stroller frame 12.

In order to provide further support for the second travel seat 122, a support 166 is preferably mounted between the upper horizontal support rails 22, 24 above the rear seat base 124. As shown in FIGS. 16 and 17, a rear portion 168 of the child travel seat 122 can rest on support 166 to further assist in maintaining the child seat 122 in an upright orientation.

The support 166 is preferably spaced at least eight (8) inches above the rear seat base 124 in accordance with ASTM Standard No. F833.07a ("Standard Consumer Safety Performance Specification for Carriages and Strollers). In addition, an eight inch sphere can pass within a perimeter defined by the rear seat base 124, support 166, and front assembly 56 and fall to the ground, even when a travel seat 116 is mounted to the front end 114 of the stroller 10. Designing a stroller with this space within the rear seat base 124, support 166, and front seat assembly 56 is intended to prevent inadvertent suffocation if a child slips within the rear seat of the stroller. One of ordinary skill in the art will recognize that this design is even more difficult to accomplish in a tandem stroller, particularly where a shortened overall length of the stroller is desired.

One of ordinary skill in the art will recognize that the previously described configuration of the tandem stroller frame 12 according to the present invention also allows the length between the front wheel assemblies 40, 42 and rear wheel assemblies 44, 46 (i.e., wheelbase length) of the stroller 10 to be reduced in comparison to known tandem strollers, which makes the stroller 10 of the present invention easier to maneuver. This is because no additional components or mounting accessories are required to be mounted to the stroller frame 12 to attach a child travel seat to the front end 14 of the stroller 10. Such components or mounting accessories increase the length of the stroller or require a greater wheelbase length in order to compensate by any imbalance or uneven front load created by using an additional travel seat components or mounting accessory. In this manner, the stroller 10 according to the present invention is also more convenient because it allows a travel seat to be mounted to the front end 14 of the frame 12 without additional components or mounting accessories.

The tandem stroller 10 of the present invention can also be compactly collapsed for increased operator convenience and to minimize storage space as shown in FIG. 3. The stroller 10 can be collapsed by releasing the secure engagement between the left and right handlebar arms 48, 50 and the left and right rear legs 34, 36 as described above. The left handlebar arms 48 are then moved about pivots P7 and P9 and the right handlebar arm 50 are moved about pivots P8 and P10 resulting in the pushbar 52 being adjacent the front end 14 of the stroller frame 12 in the collapsed position. Movement of the handlebar arms about pivots P7, P8, P9, and P10, in turn causes rear legs 34 and 36 to move about pivots P5, P6 and the front legs to move about pivots P1, P2, P3, P4 to be positioned toward the rear end 16 of the stroller frame 12 in the collapsed position (see FIG. 3).

Referring to FIGS. 1, 2, and 19-23, a rear seat footrest 170 can also be connected to the lower horizontal support rails 26, 28. In a preferred embodiment shown in FIGS. 19 and 20, the rear seat footrest 170 is preferably U-shaped and fixedly connected to the left and right lower horizontal support rails 26, 28. The rear seat base 124 preferably includes a rear seat pan 172 secured to left and right rails 174, 176.

Figure 22:
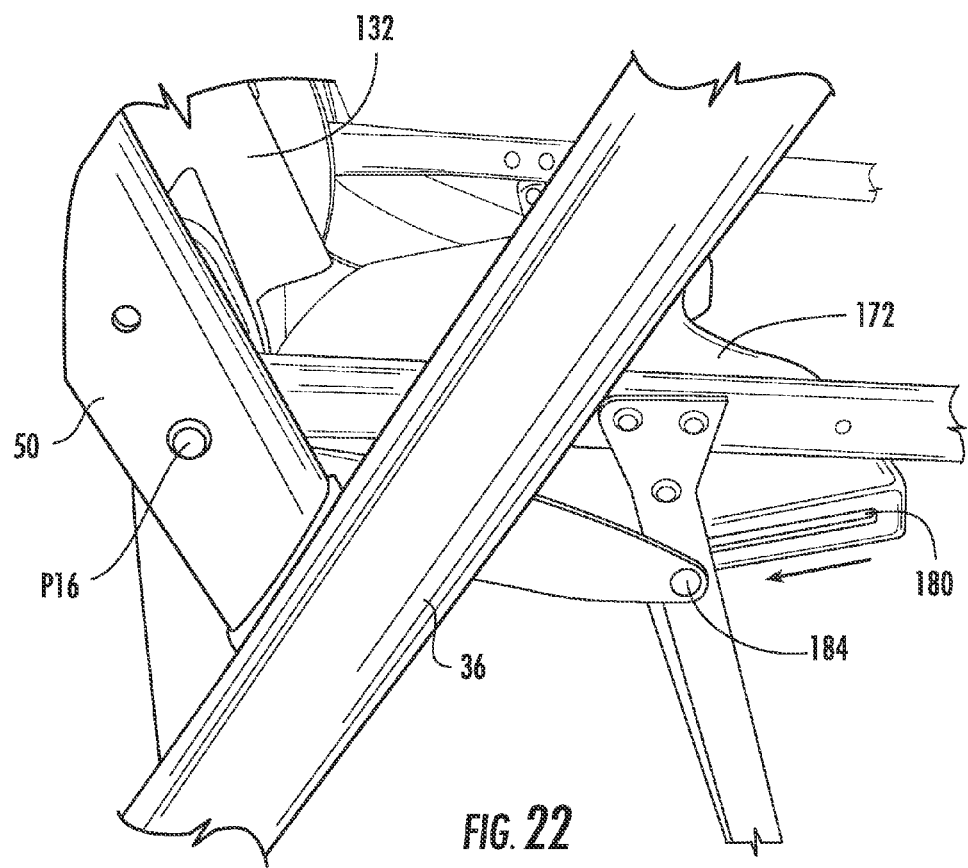
FIG. 22 is a fragmentary perspective view of the stroller of FIG. 21, illustrating the right side attachment between the rear seat and frame when the stroller is in an operating position.
Figure 23:
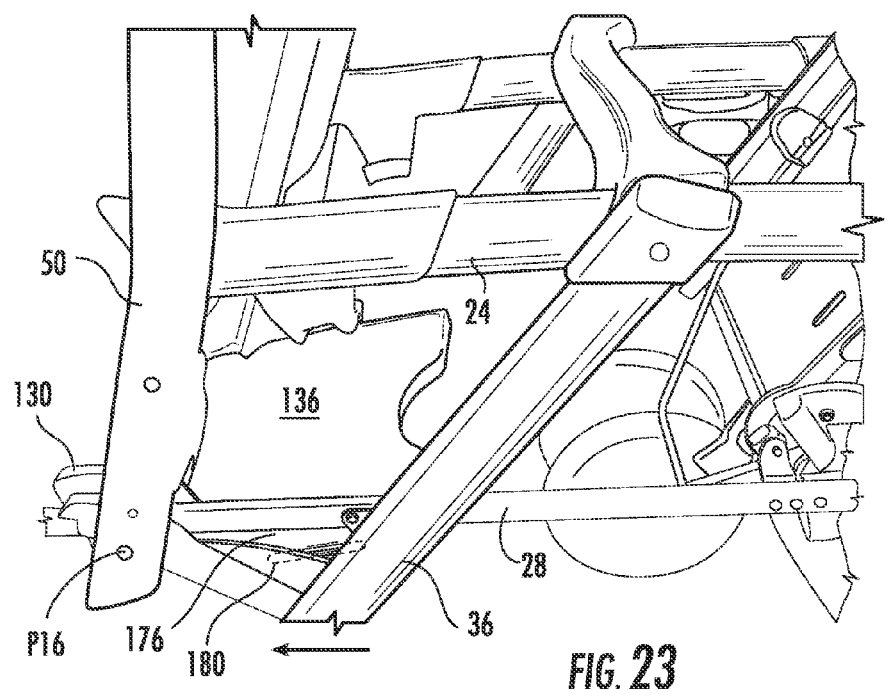
FIG. 23 is a fragmentary perspective view of the stroller of FIG. 21, illustrating the right side attachment between the rear seat and frame when the stroller is in a partially collapsed position.

In an alternative embodiment, shown in FIGS. 21-23 the rear seat footrest 170 is pivotally connected to the left and right lower horizontal support rails 26, 28. The left and right rails 174, 176 are connected to the rear seat back frame 132 at pivot points P19, P20 (FIG. 21). The rear seat rails 174, 176 each include a slot 178, 180. Left and right pins 182, 184 extending from the rear seat footrest 170 slide within slots 178, 180. When the stroller 10 is in an operating position (FIGS. 21 and 22), pins 182, 184 are positioned within an end of slots 178, 180 toward the rear end 16 of the stroller frame 12. When the stroller 10 is moved to a collapsed position, the rear seat back 126 is pivoted in coordination with the handlebar assembly 38, which in turn causes the seat rails 174, 176 to slide along pins 182, 184 in the direction of the arrow in FIGS. 22 and 23, and to be positioned at an end of slots 178, 180 toward to the front end 14 of the stroller frame 12. This movement of the pins 182, 184 along slots 178, 180 permits the rear seat base 124 to be positioned closer to the rear wheel assemblies 44, 46 and distanced from the front wheel assemblies 40, 42 when the stroller 10 is in the collapsed position.

Figure 12:
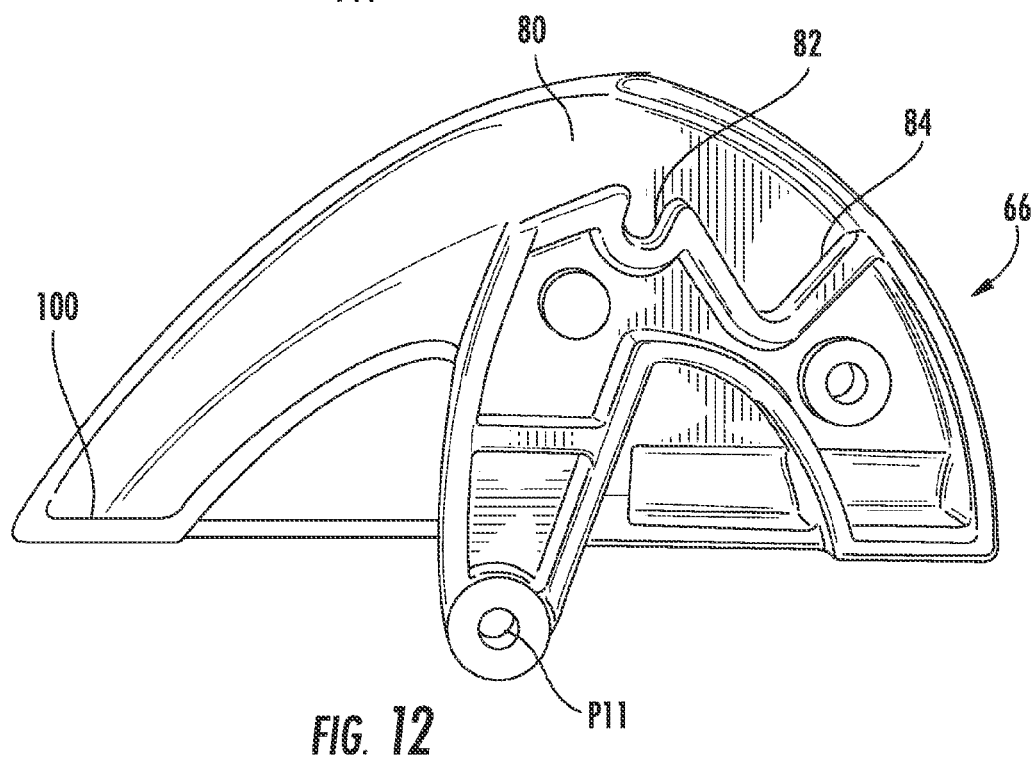
FIG. 12 illustrates an alternative embodiment of the right front seat adjustment assembly of FIG. 11.

The tandem stroller 10 of the present invention is also designed to permit the front and rear seat backs 62, 124 to retain their last adjustment position when the stroller is moved between operating and collapsed positions. Referring to FIGS. 10-12, the left and right seat adjustment assemblies 64, 66 of the front seat assembly 56 are pivotally connected to the left and right lower horizontal support rails 26, 28 at pivot points P11, P12. Left and right links 186, 188 connect the left and right seat adjustment assemblies 64, 66 to the front legs 30, 32. The left and right links 186, 188 preferably have a pivotal connection with both the left and right seat adjustment assemblies 64, 66 and the front legs 30, 32. As the front legs of 30, 32 of the stroller frame 12 are pivoted toward the rear end 16 of the stroller frame 12 when the stroller 10 is collapsed, links 186, 188 cause the left and right seat adjustment assemblies 64, 66 to pivot about pivot points P11, P12 in a direction toward the front end 14 of the stroller frame 12. This permits the stroller 10 to be collapsed with the front seat back 62 in any of the positions previously discussed, and avoids the additional preparatory step of adjusting the seat back 62 to a specific position prior to collapsing the stroller 10. An added benefit of this design is that it permits the front seat back 62 to retain its last position when the stroller 10 is moved between from a collapsed position and back to its operating position.

The rear seat back 126 of the rear seat assembly 58 also retains its last adjustment position when the stroller 10 is moved between operating and collapsed positions in a substantially similar manner as the front seat back 62. The left and right rear seat adjustment assemblies 128, 130 are preferably pivotally connected to the left and right lower horizontal support rails 26, 28, and the left and right handlebar arms 48, 50. As the stroller 10 is collapsed, the rear seat adjustment assemblies 128, 130 pivot along with the handlebar arms 48, 50, which permits the stroller 10 to be collapsed with the rear seat back 126 in an upright or any of the reclined back support positions previously discussed and the rear seat back 126 to retain its last position when the stroller 10 is moved from a collapsed position and back to its operating position.

The stroller 10 of the present invention may also include one or more cupholders 200. As shown in FIGS. 1, 2, 7, 8, 13, 15-19, 21, 24, and 25, the cupholders 200 are positioned at front ends of each of the upper horizontal support rails 22, 24, at which position a cup or other container disposed in the cupholder 200 is easily accessible to a child seated in the front seat assembly 56. Preferably, each of the upper horizontal support rails 22, 24 includes a cupholder 200, but a person of ordinary skill in the art would appreciate that the stroller 10 could be provided with a single cupholder 200 as well. The cupholders 200 each include a mount 202 and a receptacle 204, preferably having a cylindrical wall 206 with a closed base 208 to facilitate housing of a cup or container. The cupholders preferably extend from the upper horizontal support rails 22, 24 such that the cylindrical walls 206 are substantially tangent to the upper horizontal support rails 22, 24, with the cylindrical shape formed thereby extending outside of the space between the upper horizontal support rails 22, 24. In this manner, the receptacles 204 will not interfere with movement of the components of the front seat assembly 56 during collapsing of the stroller 10 or pivoting of the seat assembly 56.

Figure 25:
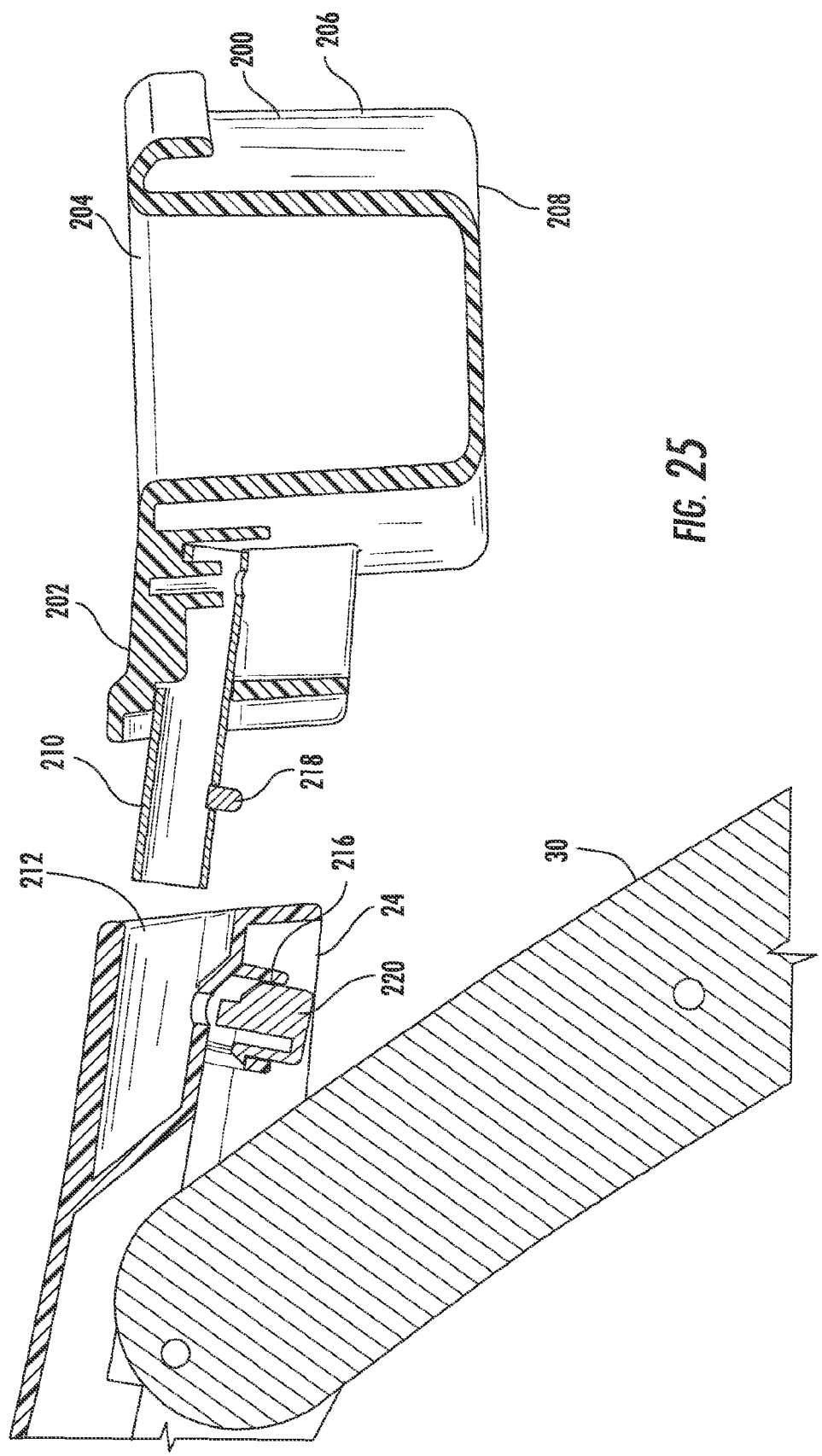
FIG. 25 is a cross sectional view of the cupholder of the stroller of FIG. 1.

A preferred mounting configuration of the left cupholder 200 is shown in detail in FIG. 25, but it should be understood that the right cupholder 200 can be a mirror image thereof, mounted in the same manner. As shown, the cupholder 200 includes a shaft 210 extending from the mount 202. The shaft 210 fits within an open interior region 212 of the upper horizontal support rail 24, which has a generally tubular shape. A release button 214 (FIGS. 1, 2, 7, 15 and 16) is provided on the upper horizontal support rail 24 and includes an extension 220 affixed in a slidable manner within inner channel 216 of the upper horizontal support rail 24. The release button extension 220 is in communication with a release tab 218 extending outward from the shaft 210 and partially into the channel 216 to axially lock the shaft 210 and thus the cupholder 200 in place on the upper horizontal support rail 24. The release tab 218 is configured to slide within the shaft 210, but is preferably biased to extend outward therefrom, as shown in FIG. 25. When the release button 220 is pushed, the extension 220 slides within the channel 216 until it contacts the release tab 218, pushing it partially within the shaft 210, so that the shaft 210 can then slide axially outward from the upper horizontal support rail 24 and the cupholder 200 can be removed therefrom. This mounting configuration, which permits engagement and disengagement of the cupholder by axial movement with respect to the upper horizontal support rail 24, is advantageous over prior art solutions in which the cupholder is engaged or disengaged by way of perpendicular movement with respect to the upper horizontal support rail, which can permit the cupholder to become inadvertently disengaged, for example when the cupholder is accidentally bumped by a child seated in the stroller.

Figure 26:
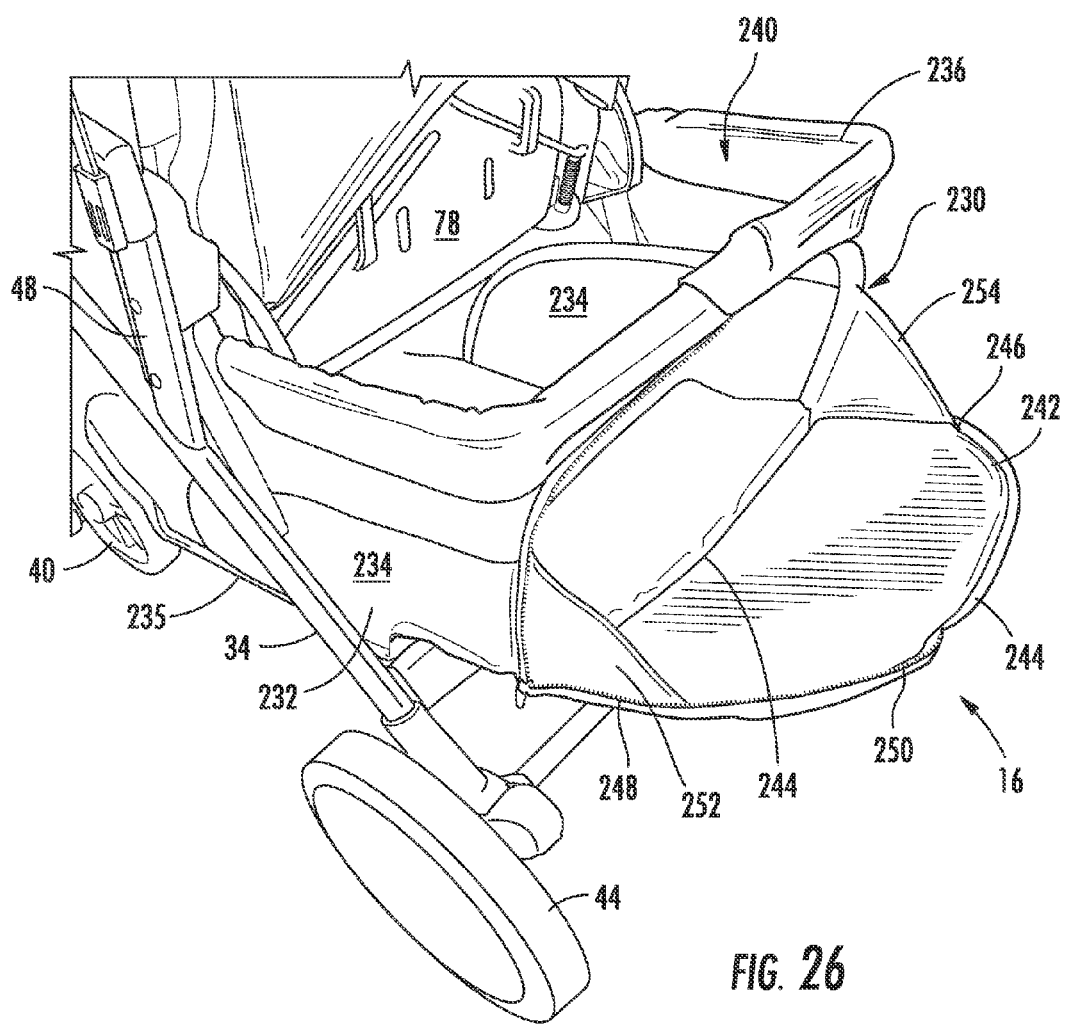
FIG. 26 is a perspective view of the rear portion of the stroller of FIG. 1, showing the basket, including a fabric basket body disposed over the basket frame.

The basket 230 of the stroller 10 of the present invention is shown in detail in FIG. 26. As shown, the basket 230 includes a u-shaped basket frame 39 (FIGS. 1, 2, 8, 10, 16, 17, 19, 21, and 24) extending from the lower horizontal support rails 26, 28. A fabric body 232 is fitted over the frame 39, preferably by an upper edge 236 of the body 232 looped around the frame 39 to form the basket 230, which extends generally beneath the seat assemblies 56, 58 and back to a region beneath the handlebar assembly 38. In this manner, the basket 230 is difficult to access by a child seated in the front or rear seat assembly 56, 58, but easily accessible to an operator of the stroller 10. The body 232 of the basket 230 preferably has a closed base 235 and side walls 234 extending between the base 235 and the frame 39 to form a receptacle area with an open top area 240. As shown in detail in FIG. 26, the basket 230 preferably includes a rear access panel 242. The rear access panel 242 creates an additional opening that is accessible to an operator of the stroller 10. This may be useful in situations where the open top area 240 is difficult to access, for example when the rear seat assembly 58 is in a reclined position, in which it may partially obstruct the open top 240. The rear access panel 242 also avoids the need for hinged basket frames, which pivot down to permit access to the basket.

As shown in FIG. 26, the rear access panel 242 includes a bottom edge 244 pivotally attached to the base 235 of the fabric body 232, as well as top, and right and left side edges 244, 246, 248 that are removably affixable to the fabric body 232, for example by a zipper 250, as shown in the illustrated embodiment. Engagement and disengagement of the zipper 250 permits pivotal opening and closing of the rear access panel 242. Side hinge panels 252, 254 are also preferably provided, joining outer edges of the rear access panel 242 to the fabric body 232. As shown, the side hinge panels 252, 254 are preferably generally triangular in shape, and widen as they extend upward from the bottom edge 244. The hinge panels 252, 254 limit the degree of pivotal movement permissible between the rear access panel 242 and the fabric body 232 during opening of the rear access panel 242, and thus prevent the rear access panel 242 from dragging on the ground or interfering with moving parts of the stroller 10 such as the rear wheel assemblies 44, 46. When the rear access panel 242 is closed, the hinge panels 252, 254 fold and collapse inward so that they are securely retained within the basket 230 and cannot interfere with any of the moving parts of the stroller 10.

Figure 24:
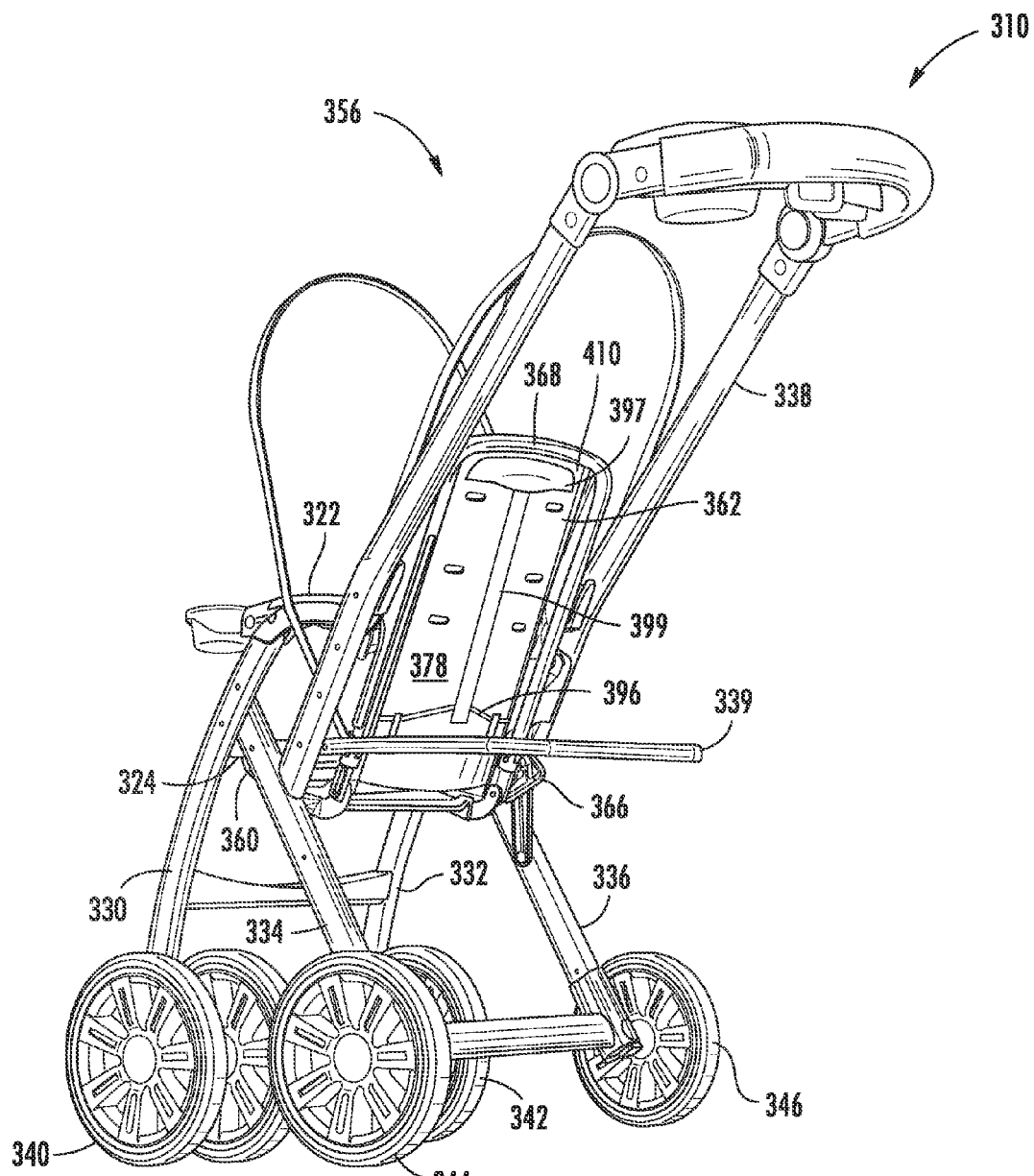
FIG. 24 is a rear perspective view of a single stroller of the present invention in an operating position with the soft goods removed.

An alternative embodiment of the present invention in which various features described above are implemented in a single stroller 310 is shown in FIG. 24. Like the tandem stroller described above, the single stroller 310 includes left and right upper horizontal support rails 322, 324 and left and right lower horizontal support rails 326, 328, left and right front legs 330, 332, rear legs 334, 336, a handle bar assembly 338, a basket frame 339, and wheel assemblies 340, 342, 344, 346 affixed at the bottom of legs 330, 332, 334, 336. The single stroller 310 differs from the tandem stroller 10 above in that only a single seat assembly 356 is provided. The seat assembly 356 is preferably configured the same as the front seat assembly 56 of the tandem stroller 10 described above. In particular, the seat assembly 356 includes a seat base 360, and a seat back 362. A head support assembly 410 is attached to the seat back frame 368 in the same manner as the head support assembly 110 of the tandem stroller.

The seat assembly 356 is also preferably provided with adjustment assemblies 364, 366 having the same configuration as the front seat adjustment assemblies 64, 66 of the tandem stroller 10, as well as a grip 397, linkage 399, and guide bar 396 having ends that engage the adjustment assemblies in the same manner as those of the front seat assembly 56 of the tandem stroller 10, permitting the seat back 362 to pivot between a travel seat support position and a plurality of back support positions. Alternatively, some or all of the features of the rear seat assembly 58 of the tandem stroller 10 could be incorporated into the single stroller seat assembly 356. The seat assembly could be configured to permit mounting of a travel seat while the seat assembly 356 is in either a forward folded travel seat support position, as with the front seat assembly 56 of the tandem stroller 10 described above, or in the reclined position, as with the rear seat 58 assembly of the tandem stroller 10 described above. A person of ordinary skill in the art would understand how to incorporate these features into a single stroller and make any necessary adjustments.

While various methods, configurations, and features of the present inventions have been described above and shown in the drawings, those of ordinary skill in the art will appreciate from this disclosure that any combination of the above features can be used without departing from the scope of the present invention. Accordingly, it is recognized by those skilled in the art that changes may be made to the above described methods and embodiments of the invention without departing from the broad inventive concept thereof. It is understood, therefore, that this invention is not limited to the particular methods and embodiments disclosed, but is intended to cover all modifications which are within the spirit and scope of the invention as defined by the appended claims and/or shown in the attached drawings.

What is claimed is:

1. A stroller comprising:
   a frame convertible between an operating position for use and a collapsed position for storage, the frame comprising at least one front leg, at least one rear leg, at least one wheel mounted on each leg, and a handlebar secured to the at least one rear leg when the frame is in the operating position, the frame defining front and rear portions and right and left sides, and
   a seat having a seat base and a seat back mounted to the frame at a pivot joint, the seat base having an upper surface and a lower surface and the seat back having a front surface and a rear surface, when the frame is in the operating position the seat back is rotatable at the pivot joint relative to the frame between a plurality of back support positions and a travel seat support position, in the travel seat support position, the seat back is rotatable at the pivot joint to be substantially parallel to and above the seat base such that the front surface of the seat back is adjacent the upper surface of the seat base.

2. The stroller of claim 1, wherein the pivot joint comprises a seat articulation support, and a locking member mounted on the seat back is movable within the seat articulation support for rotation of the seat back between the plurality of back support positions.

3. The stroller of claim 2 wherein the locking member is disengagable from the seat articulation support in the travel seat support position.

4. The stroller of claim 2 further comprising left and right pivot joints, left and right seat articulation supports, and left and right locking members.

5. The stroller of claim 2 wherein the seat articulation support comprises a plurality of grooves corresponding to the plurality of back support positions and the locking member is removably engageable with a selected groove.

6. The stroller of claim 1 wherein the seat back includes a seat back frame and a seat back support;
   the pivot joint comprises a seat articulation support mounted to the frame, the seat articulation support comprising a plurality of grooves corresponding to a plurality of back support positions; and
   a locking member mounted to the seat back frame, the locking member being removably engageable with a selected one of the plurality of grooves, the locking member biased to engage the selected one of the plurality of grooves; and
   an operator control coupled to the locking member, wherein the locking member is disengagable from the selected one of the plurality of grooves upon actuation of the operator control.

7. The stroller of claim 6 wherein the seat articulation support has an open end and a closed end, and the locking member is disengagable from the open end of the seat articulation support to position the seat back in the travel seat support position.

8. The stroller of claim 6 wherein the locking member is slidably mounted along the seat back frame and spring biased toward engagement with the selected one of the plurality of grooves.

9. The stroller of claim 6 wherein the seat articulation support has first and second closed ends, the locking member engages the first closed end when the seat back is in a reclined back support position and the locking member engages the second closed end when the seat back is in the travel seat support position.

10. The stroller of claim 1 further comprising:
    a head support pivotally connected to the seat back; and
    at least one linkage having a fixed length and first and second ends, the first end pivotally connected to the head support and the second end pivotally attached to the frame,
    wherein the head support is substantially in plane with the seat back when the seat back is in one of the plurality of back support positions and disposed at a substantially perpendicular angle with respect to the seat back when the seat back is in the travel seat support position.

11. The stroller of claim 10 further comprising at least one travel seat attachment mounted to the rear surface of the seat back and engageable with a complementary attachment on a travel seat when the seat is in the travel seat support position.

12. The stroller of claim 11 further comprising a rear seat connected to the rear portion of the frame and at least one rear travel seat attachment connected to a rear portion of the frame, the at least one rear travel seat attachment being engageable with a complementary attachment on a second travel seat.

13. The stroller of claim 11 further comprising a rear seat having a rear seat base and a rear seat back mounted to the rear portion of the frame and at least one rear travel seat attachment mounted to the rear seat back, the at least one rear travel seat attachment being engageable with a complementary attachment on a second travel seat.

14. The stroller of claim 11 further comprising a rear seat having a rear seat back and a rear seat base mounted to the rear portion of the frame, the rear seat back rotatable between a back support position where the rear seat back is substantially perpendicular to the rear seat base and a reclined position; and
    at least one rear travel seat attachment mounted to a rear portion of the frame, the at least one rear travel seat attachment being engageable with a complementary attachment on a second travel seat when the rear seat is in the reclined position.

15. The stroller of claim 1 wherein the seat back is rotatable through a plurality of reclinable positions.

16. The stroller of claim 1 wherein the frame further comprises left and right horizontal rails, and a cupholder attached to each of the left and right horizontal rails at the front portion of the frame.

17. The stroller of claim 1 wherein the frame further comprises left and right horizontal rails, the seat being attached to and mounted between the left and right horizontal rails.

18. A child transportation device comprising:
   a frame having a front and rear portion and right and left sides, the frame comprising:
   at least one front leg;
   at least one rear leg;
   at least one wheel mounted to each leg;
   right and left lower horizontal support rails connected to the at least one front leg and the at least one rear leg;
   a handle bar assembly connected to the right and left lower horizontal support rails; and
   a front seat having a front seat back and a front seat base, the front seat back rotatably connected to the right and left lower horizontal support rails at right and left pivot joints, the front seat base connected to the right and left lower horizontal support rails at the front portion of the frame, the front seat back being rotatable at the right and left pivot joints relative to the front seat base between a plurality of back support positions and a travel seat support position where the front seat back is substantially parallel to and above the front seat base when the stroller is in an operating position.

19. The child transportation device of claim 18, further comprising a rear seat having a rear seat back and a rear seat base connected to the right and left lower horizontal support rails at the rear portion of the frame, the rear seat back being rotatable relative to the rear seat base between a back support position and a reclined position.

20. The child transportation device of claim 19 further comprising a first travel seat mount attached to a rear surface of the front seat back, the first travel seat mount engageable with a complementary securing member on a first travel seat when the front seat is in the travel seat support position.

21. The child transportation device of claim 20 further comprising a second travel seat mount attached to the rear portion of the frame, the second travel seat mount engageable with a complementary securing member on a second travel seat when the rear seat back is in the reclined position.

22. The child transportation device of claim 18, further comprising a basket, the basket including a generally u-shaped basket frame having a first end affixed to the right lower horizontal support rail and a second end affixed to the left lower horizontal support rail, and a fabric body fitted over the frame and having an open top, base, opposite side walls extending between the open top and the base, and an access panel pivotally affixed to the fabric body and oriented towards the rear portion of the stroller frame.

23. A collapsible stroller comprising:
   a collapsible frame having a front portion and a rear portion, and comprising a left and right side support rails, a plurality of legs pivotally connected to the support rails, and at least one wheel mounted to each of the legs;
   at least one seat supported by the frame, the seat comprising a seat base and a seat back pivotally connected to the seat base, the seat base being slidably affixed to at least one counter structure attached to the frame;
   wherein each of the legs pivots with respect to at least one of the support rails to move the stroller between an operating position and a collapsed position, and the seat base slides with respect to the at least one counter structure in a direction towards the rear portion of the frame when the stroller is moved towards the collapsed position.

24. The stroller of claim 23, wherein the at least one counter structure is a pin that engages a slot formed in the seat base.

25. The stroller of claim 1 wherein the frame further comprises left and right horizontal rails, and the pivot joint further comprises left and right pivot joints attached to a respective left and right horizontal rail.

* * * * *